US011955645B2

(12) United States Patent
Steinbach et al.

(10) Patent No.: US 11,955,645 B2
(45) Date of Patent: Apr. 9, 2024

(54) CATALYST

(71) Applicant: 3M Innovative Properties Company, Saint Paul, MN (US)

(72) Inventors: Andrew J. L. Steinbach, Shoreview, MN (US); Andrew T. Haug, Woodbury, MN (US); Krzysztof A. Lewinski, Mahtomedi, MN (US); Amy E. Hester, Hudson, WI (US); Grant M. Thoma, Inver Grove Heights, MN (US); Cedric Bedoya, Woodbury, MN (US); Zhenhua Zeng, West Lafayette, IN (US); Jeffrey P. Greeley, West Lafayette, IN (US)

(73) Assignee: 3M Innovative Properties Company, Saint Paul, MN (US)

( * ) Notice: Subject to any disclaimer, the term of this patent is extended or adjusted under 35 U.S.C. 154(b) by 805 days.

(21) Appl. No.: 17/047,029

(22) PCT Filed: Apr. 11, 2019

(86) PCT No.: PCT/IB2019/053001
§ 371 (c)(1),
(2) Date: Oct. 12, 2020

(87) PCT Pub. No.: WO2019/198029
PCT Pub. Date: Oct. 17, 2019

(65) Prior Publication Data
US 2021/0075026 A1    Mar. 11, 2021

Related U.S. Application Data

(60) Provisional application No. 62/657,189, filed on Apr. 13, 2018.

(51) Int. Cl.
*H01M 4/90*    (2006.01)
*H01M 4/86*    (2006.01)
*H01M 4/92*    (2006.01)

(52) U.S. Cl.
CPC ....... *H01M 4/9041* (2013.01); *H01M 4/8657* (2013.01); *H01M 4/9058* (2013.01); *H01M 4/92* (2013.01)

(58) Field of Classification Search
CPC ..... H01M 4/9041; H01M 4/8657; H01M 4/92
(Continued)

(56) References Cited

U.S. PATENT DOCUMENTS 4,340,276 A    7/1982 Maffitt
4,447,506 A    5/1984 Luczak
(Continued)

FOREIGN PATENT DOCUMENTS

CN    102820475    2/2016
EP    2959968    12/2015
(Continued)

OTHER PUBLICATIONS

Artem, "Development of Ternary and Quaternary Catalysts for The Electrooxidation of Glycerol", The Scientific World Journal, 2012, vol. 2012, Article ID 502083, 6 pages.
(Continued)

*Primary Examiner* — James M Erwin
(74) *Attorney, Agent, or Firm* — Mueting Raasch Group

(57) ABSTRACT

Catalysts comprising a Ta layer having an outer layer with a layer comprising Pt directly thereon, wherein the Ta layer has an average thickness in a range from 0.04 to 30 nanometers, wherein the layer comprising Pt has an average thickness in a range from 0.04 to 50 nanometers, and wherein the Pt and Ta are present in an atomic ratio in a range from 0.01:1 to 10:1. Catalyst described herein are
(Continued)

useful, for example, in fuel cell membrane electrode assemblies.

18 Claims, 11 Drawing Sheets

(58) Field of Classification Search
USPC .......................................................... 429/454
See application file for complete search history.

(56) References Cited

U.S. PATENT DOCUMENTS

| | | | |
|---|---|---|---|
| 4,568,598 | A | 2/1986 | Bilkadi |
| 4,812,352 | A | 3/1989 | Debe |
| 5,039,561 | A | 8/1991 | Debe |
| 5,068,161 | A | 11/1991 | Keck |
| 5,183,713 | A | 2/1993 | Kunz |
| 5,338,430 | A | 8/1994 | Parsonage |
| 5,759,944 | A | 6/1998 | Buchanan |
| 5,879,827 | A | 3/1999 | Debe |
| 5,879,828 | A | 3/1999 | Debe |
| 6,040,077 | A | 3/2000 | Debe |
| 6,136,412 | A | 10/2000 | Spiewak |
| 6,319,293 | B1 | 11/2001 | Debe |
| 6,805,972 | B2 | 10/2004 | Erlebacher |
| 7,419,741 | B2 | 9/2008 | Vernstrom |
| 7,901,829 | B2 | 3/2011 | Debe |
| 8,211,825 | B2 | 7/2012 | Mei |
| 8,673,773 | B2 | 3/2014 | Oppermann |
| 8,748,330 | B2 | 6/2014 | Debe |
| 8,895,206 | B2 | 11/2014 | Erlebacher |
| 2002/0004453 | A1 | 1/2002 | Haugen |
| 2004/0048466 | A1 | 3/2004 | Gore |
| 2005/0053826 | A1 | 3/2005 | Wang |
| 2010/0047668 | A1 | 2/2010 | Steinbach |
| 2012/0251915 | A1* | 10/2012 | Mei ................... H01M 8/1004 429/479 |
| 2014/0246304 | A1 | 9/2014 | Debe |
| 2015/0093685 | A1 | 4/2015 | Yang |
| 2015/0311536 | A1 | 10/2015 | Atanasoska |
| 2015/0380758 | A1 | 12/2015 | Ball |
| 2016/0079604 | A1 | 3/2016 | Atanasoski |
| 2017/0200956 | A1* | 7/2017 | Nagami ............... H01M 4/926 |
| 2018/0062181 | A1 | 3/2018 | Gath |

FOREIGN PATENT DOCUMENTS

| | | |
|---|---|---|
| EP | 2954579 | 4/2018 |
| EP | 2843066 | 8/2019 |
| JP | H03-236160 | 10/1991 |
| JP | H06-132034 | 5/1994 |
| JP | 2010-280974 | 12/2010 |
| JP | 2011-014475 | 1/2011 |
| WO | WO 2001-048839 | 7/2001 |
| WO | WO 2008-025750 | 3/2008 |
| WO | WO 2009-135189 | 11/2009 |
| WO | WO 2010-092369 | 8/2010 |
| WO | WO 2010-138138 | 12/2010 |
| WO | WO 2012-017226 | 2/2012 |
| WO | WO 2012-107738 | 8/2012 |
| WO | WO 2013-055533 | 4/2013 |
| WO | WO 2014-099790 | 6/2014 |
| WO | WO 2014-122426 | 8/2014 |
| WO | WO 2014-122427 | 8/2014 |
| WO | WO 2016-100034 | 6/2016 |
| WO | WO 2016-191057 | 12/2016 |
| WO | WO 2018-080791 | 5/2018 |
| WO | WO 2019-193458 | 10/2019 |
| WO | WO 2019-193460 | 10/2019 |
| WO | WO 2019-193461 | 10/2019 |
| WO | WO 2019-195046 | 10/2019 |
| WO | WO 2019-198029 | 10/2019 |
| WO | WO 2019-198031 | 10/2019 |
| WO | WO 2019-198033 | 10/2019 |

OTHER PUBLICATIONS

Arun, "Electrochemical Characterization of Pt13 Ru—Ni/C Anode Electrocatalyst for Methanol Electrooxidation in Membraneless Fuel Cells", RSC Advances, Jun. 2015, vol. 5, pp. 49643-49650.

Cheng, "Enhanced Activity and Stability of Core-Shell Structured $PtRuNi_x$ Electrocatalysts for Direct Methanol Fuel Cells," International Journal of Hydrogen Energy, Jan. 2016, vol. 41, No. 3, pp. 1935-1943.

Chessin, "Paramagnetic Susceptibility, Electrical Resistivity, and Lattice Parameters of Nickel-Rich Nickel-Tantalum Alloys", Journal of Applied Physics, Aug. 1964, vol. 35 No. 8, pp. 2419-2423.

Choi, "Methanol Oxidation on Pt/Ru, Pt/Ni, and Pt/Ru/Ni Anode Electrocatalysts at Different Temperatures for DMFCs", Journal of the Electrochemical Society, 2003, vol. 150, No. 7, pp. A973-A978.

Chow, "Fabrication of Biologically Based Microstructure Composites for Vacuum Field Emission", Materials Science and Engineering A, Oct. 1992, vol. 158, No. 1, pp. 1-6.

Clancey, "Atomic Layer Deposition of Ultrathin Platinum Films on Tungsten Atomic Layer Deposition Adhesion Layers: Application to High Surface Area Substrates", Journal of Vacuum Science and Technology, Part A, Jan./Feb. 2015, vol. 33, No. 1, 9 pages.

Cooper, et al., "Combinatorial screening of fuel cell cathode catalyst compositions", Applied Surface Science, Nov. 2007, vol. 254, No. 3, pp. 662-668.

Debe, "Effect of Gravity on Copper Phthalocyanine Thin Films III: Microstructure Comparisons of Copper Phthalocyanine Thin Films Grown in Microgravity and Unit Gravity", Thin Solid Films, 186, 1990, pp. 327-347.

Debe, "Vacuum Vapor Deposited Thin Films of a Perylene Dicarboxide Derivative: Microstructure Versus Deposition Parameters", Journal of Vacuum Science & Technology A, vol. 6, No. 3, May/Jun. 1988, pp. 1907-1911.

Edwards, "Basic Materials Physics of Transparent Conducting Oxides", Dalton Transactions, 2004, vol. 19, pp. 2995-3002.

Erlebacher, "Evolution of Nanoporosity in Dealloying", Letters to Nature, Nature, Mar. 2001, vol. 410, pp. 450-453.

Gerstenberg "Effects of Nitrogen, Methane, and Oxygen on Structure and Electrical Properties of Thin Tantalum Films", Journal of Applied Physics, Feb. 1964, vol. 35, No. 2, pp. 402-407.

Hitosugi, Ta-doped Anatase $TiO_2$ Epitaxial Film as Transparent Conducting Oxide, Japanese Journal of Applied Physics, 2005, vol. 44, No. 34, pp. L1063-L1065.

Hu, "A Facile and Surfactant-Free Route for Nanomanufacturing of Tailored Ternary Nanoalloys as Superior Oxygen Reduction Reaction Electrocatalysts", Catalysis Science & Technology, Apr. 2017, vol. 7. No. 10, pp. 2074-2086.

Ioroi, "Platinum-Iridium Alloys as Oxygen Reduction Electrocatalysts for Polymer Electrolyte Fuel Cells", Journal of The Electrochemical Society, 2005, vol. 152, No. 10, pp. A1917-A1924.

Johnson, "In Situ Reactivity and TOF-SIMS Analysis of Surfaces Prepared by Soft and Reactive Landing of Mass-Selected Ions", Analytical Chemistry, 2010, vol. 82, No. 13, pp. 5718-5727.

Johnson, "Preparation of Surface Organometallic Catalysts by Gas-Phase Ligand Stripping and Reactive Landing of Mass-Selected Ions", Chemistry: A European Journal, 2010, vol. 16, No. 48, pp. 14433-14438.

Ju, "Electrical Properties of Amorphous Titanium Oxide Thin Films for Bolometric Application", Advances in Condensed Matter Physics, Nov. 2013, Article ID 365475, 5 pages.

Kam, "Summary Abstract: Dramatic Variation of the Physical Microstructure of a Vapor Deposited Organic Thin Film", Journal of Vacuum Science & Technology A, vol. 5, No. 4, Jul./Aug. 1987, pp. 1914-1916.

Kim, "High-Performance Quaternary PtRuIrNi Electrocatalysts with Hierarchical Nanostructured Carbon Support", Journal of Catalysis, Oct. 2013, vol. 306, pp. 133-145.

Lee, "Measurement and Modeling of the Reflectance-Reducing Properties of Gradient Index Microstructured Surfaces", Photographic Science and Engineering, vol. 24, No. 4, Jul./Aug. 1980, pp. 211-216.

(56) References Cited

OTHER PUBLICATIONS

Lewinski, "NSTF Advances for PEM Electrolysis—the Effect of Alloying on Activity of NSTF Electrolyzer Catalysts and Performance of NSTF Based PEM Electrolyzers", ECS Transactions, Oct. 2015, vol. 69, No. 17, pp. 893-917.
Li, "Preparation and Electrochemical Research of Anode Catalyst PtRuNi/C for Direct Methanol Fuel Cell", Journal of Biobased Materials and Bioenergy, Aug. 2013, vol. 7, No. 4, pp. 525-528.
Liang, "Synthesis and Structure—Activity Relationship Exploration of Carbon-Supported PtRuNi Nanocomposite as a CO-Tolerant Electrocatalyst for Proton Exchange Membrane Fuel Cells", Journal of Physical Chemistry B, Mar. 2006, vol. 110, No. 15, pp. 7828-7834.
Liu, "Methanol Oxidation on Carbon-Supported Pt—Ru—Ni Ternary Nanoparticle Electrocatalysts", Journal of Power Sources, Jan. 2008, vol. 175, No. 1, pp. 159-165.
Liu, "Segmented Pt/Ru, Pt/Ni, and Pt/RuNi Nanorods as Model Bifunctional Catalysts for Methanol Oxidation", Small, Jan. 2006, vol. 2, No. 1, pp. 121-128.
Liu, "RDE Measurements of ORR Activity of $Pt_{1-x}Ir_x$ ($0 < x < 0.3$) on High Surface Area NSTF-Coated Glassy Carbon Disks", Journal of the Electrochemical Society, 2010, vol. 157, No. 2, pp. B207-B214.
Mani, "Dealloyed Binary $PtM_3$ (M=Cu, Co, Ni) and Ternary $PtNi_3M$ (M=Cu, Co, Fe, Cr) Electrocatalysts for the Oxygen Reduction Reaction: Performance in Polymer Electrolyte Membrane Fuel Cells", Journal of Power Sources, Jan. 2011, vol. 196, No. 2, pp. 666-673.
Martinez-Huerta, "Effect of Ni Addition Over PtRu/C Based Electrocatalysts for Fuel Cell Applications", Applied Catalysis B: Environmental, Dec. 2006, vol. 69, No. 1-2, pp. 75-84.
Moreno, "Synthesis of the Ceramic-Metal Catalysts (PtRuNi—$TiO_2$) by the Combustion Method," Journal of Power Sources, Jun. 2007, vol. 169, No. 1, pp. 98-102.
Nan, "A Core-Shell $Pd_1Ru_1Ni_2$@Pt/C Catalyst with a Ternary Alloy Core and Pt Monolayer: Enhanced Activity and Stability Towards the Oxygen Reduction Reaction by the Addition of Ni", Journal of Materials Chemistry A, 2016, vol. 4, No. 3, pp. 847-855.
Ohnuma, "Amorphous Ultrafine Metallic Particles Prepared By Sputtering Method", Rapidly Quenched Metals, (Proc. of the Fifth Int. Conf. on Rapidly Quenched Metals, Wurzburg, Germany, Sep. 3-7, 1984), S. Steeb et al., eds., Elsevier Science Publishers B. V., New York, (1985), pp. 1117-1124.
Palma, "Development of Plurimetallic Electrocatalysts Prepared by Decomposition of Polymeric Precursors for $EtOH/O_2$ Fuel Cell", Journal of the Brazilian Chemical Society, Mar. 2012, vol. 23, No. 3, pp. 555-564.
Palma, "Ethanol Electrooxidation by Plurimetallic Pt-Based Electrocatalysts Prepared by Microwave Assisted Heating", Journal of the Electrochemical Society, Feb. 2014, vol. 161, No. 4, pp. F473-F479.
Papaderakis, "Ternary Pt—Ru—Ni Catalytic Layers for Methanol Electrooxidation Prepared by Electrodeposition and Galvanic Replacement", Frontiers in Chemistry, Jun. 2014, vol. 2, Art. 29, pp. 1-11.
Park, "Chemical and Electronic Effects of Ni in Pt/Ni and Pt/RuNi Alloy Nanoparticles in Methanol Electrooxidation", Journal of Physical Chemistry B, Feb. 2002, vol. 106, No. 8, pp. 1869-1877.
Paul, "Electrochemical Oxidation of Ethanol on Thin Coating of Platinum Based Material on Nickel Support", Indian Journal of Chemistry, May 2006, vol. 45, pp. 1144-1152.
Pierson, "Handbook of Refractory Carbides and Nitrides", 1996, Title Page, publication information, Preface, and pp. 1-7.
Ribadeneira, "Co-Catalytic Effect of Nickel in Pt—Ru/C and Pt—Sn/C Electrocatalysts For Ethanol Electrooxidation", Latin American Applied Research, Apr. 2010, vol. 40, No. 2, pp. 113-118.
Sadaoka, "Effects of Morphology on $NO_2$ Detection in Air at Room Temperature with Phthalocyanine Thin Films", Journal of Materials Science, vol. 25, 1990, pp. 5257-5268.
Scott, "The Journal of the Institute of Metals", 1919, vol. XXI, Title page, Table of Contents, and p. 441.
Shao, "Evaluation of the Performance of Carbon Supported Pt—Ru—Ni—P as Anode Catalyst for Methanol Electrooxidation", Fuel Cells, 2010, vol. 10, No. 3, pp. 472-477.
Shen, "Comparison Study of Few-Layered Graphene Supported Platinum and Platinum Alloys for Methanol and Ethanol Electro-Oxidation" Journal of Power Sources, Mar. 2015, vol. 278, pp. 235-244.
Sheng Sui, "TiC Supported Pt—Ir Electrocatalyst Prepared by a Plasma Process for The Oxygen Electrode in Unitized Regenerative Fuel Cells", Journal of Power Sources, 2011, vol. 196, No. 13, pp. 5416-5422.
Shui, "Evolution of Nanoporous Pt—Fe Alloy Nanowires by Dealloying and their Catalytic Property for Oxygen Reduction Reaction", Advanced Functional Materials, Sep. 2011, vol. 21, No. 17, pp. 3357-3362.
Sudachom, "One Step $NaBH_4$ Reduction of Pt—Ru—Ni Catalysts on Different Types of Carbon Supports for Direct Ethanol Fuel Cells: Synthesis and Characterization," Journal of Fuel Chemistry and Technology, May 2017, vol. 45, No. 5, pp. 596-607.
Sun, "Ternary PtRuNi Nanocatalysts Supported on N-Doped Carbon Nanotubes: Deposition Process, Material Characterization, and Electrochemistry", Journal of the Electrochemical Society, Aug. 2009, vol. 156, No. 10, pp. B1249-B1252.
Tang, "High dispersion and electrocatalytic properties of platinum on well-aligned carbon nanotube arrays", Carbon, 2004, vol. 42, pp. 191-197.
Vliet, "Mesostructured thin films as electrocatalysts with tunable composition and surface morphology", Nature Materials, Dec. 2012, vol. 11, No. 12, pp. 1051-1058.
Wang, "Structurally ordered intermetallic platinum-cobalt core-shell nanoparticles with enhanced activity and stability as oxygen reduction electrocatalysts", Nature Materials, Jan. 2013, vol. 12, No. 1, pp. 81-87.
Wang, "An Advantageous Method for Methanol Oxidation: Design and Fabrication of a Nanoporous PtRuNi Trimetallic Electrocatalyst", Journal of Power Sources, Nov. 2011, vol. 196, No. 22, pp. 9346-9351.
Wang, "Effect of a Carbon Support Containing Large Mesopores on the Performance of a Pt—Ru—Ni/C Catalyst for Direct Methanol Fuel Cells", Journal of Physical Chemistry C, 2010, vol. 114, No. 1, pp. 672-677.
Wang, "Effect of Annealing Heat Treatment on Stability of Pt—Ru—Ni/C Catalyst for Direct Methanol Fuel Cell", Chinese Journal of Power Sources, Feb. 2009, Abstract only.
Wang, "Effect of Ni on PtRu/C Catalyst Performance for Ethanol Electrooxidation in Acidic Medium", Journal of Physical Chemistry C, 2008, vol. 112, No. 16, pp. 6582-6587.
Wang, "Electrochemical Impedance Studies on Carbon Supported PtRuNi and PtRu Anode Catalysts in Acid Medium for Direct Methanol Fuel Cell", Journal of Power Sources, Feb. 2007, vol. 165, No. 1, pp. 9-15.
Woo, "Electrocatalytic Characteristics of Pt—Ru—Co and Pt—Ru—Ni Based on Covalently Cross-Linked Sulfonated Poly (ether ether ketone)/Heteropolyacids Composite Membranes for Water Electrolysis", Journal of Industrial and Engineering Chemistry, Sep. 2010, vol. 16, No. 5, pp. 688-697.
Yang, "Truncated Octahedral Platinum-Nickel-Iridium Ternary Electrocatalyst for Oxygen Reduction Reaction", Journal of Power Sources, 2015, vol. 291, pp. 201-208.
Ye, "Carbon Nanotubes Supported Pt—Ru—Ni as Methanol Electro-Oxidation Catalyst for Direct Methanol Fuel Cells", Journal of Natural Gas Chemistry, Jun. 2007, vol. 16, No. 2, pp. 162-166.
Yousaf, "Method to Prepare Ternary Methanol Electro-Oxidation Catalysts for Direct Methanol Fuel Cell Applications", Journal of The Electrochemical Society, Apr. 2017, vol. 164, No. 6, pp. 667-673.
Zhang, "Preparation of Pt—Ru—Ni Ternary Nanoparticles by Microemulsion and Electrocatalytic Activity for Methanol Oxidation," Materials Research Bulletin, Feb. 2007, vol. 42, No. 2, pp. 327-333.

(56) References Cited

OTHER PUBLICATIONS

Zhao, "Electrodeposition of Pt—Ru and Pt—Ru—Ni Nanoclusters on Multi-Walled Carbon Nanotubes for Direct Methanol Fuel Cell", International Journal of Hydrogen Energy, Mar. 2014, vol. 39, No. 9, pp. 4544-4557.
International Search Report for PCT International Application No. PCT/IB2019/053001, dated Jul. 4, 2019, 6 pages.
International Search Report for PCT International Application No. PCT/IB2019/053003, dated Sep. 2, 2019, 7 pages.
International Search Report for PCT International Application No. PCT/IB2019/053006, dated Jul. 12, 2019, 4 pages.
International Search Report for PCT International Application No. PCT/IB2019/052496, dated Jun. 6, 2019, 5 pages.
International Search Report for PCT International Application No. PCT/IB2019/052498, dated Jun. 17, 2019, 5 pages.
International Search Report for PCT International Application No. PCT/IB2019/052499, dated Jun. 6, 2019, 5 pages.
International Search Report for PCT International Application No. PCT/US2019/024258, dated Sep. 25, 2019, 5 pages.
International Preliminary Report on Patentability for PCT International Application No. PCT/US2019/024258, dated Oct. 6, 2020, 8 pages.
International Preliminary Report on Patentability for PCT International Application No. PCT/IB2019/053001, dated Oct. 13, 2020, 7 pages.

\* cited by examiner

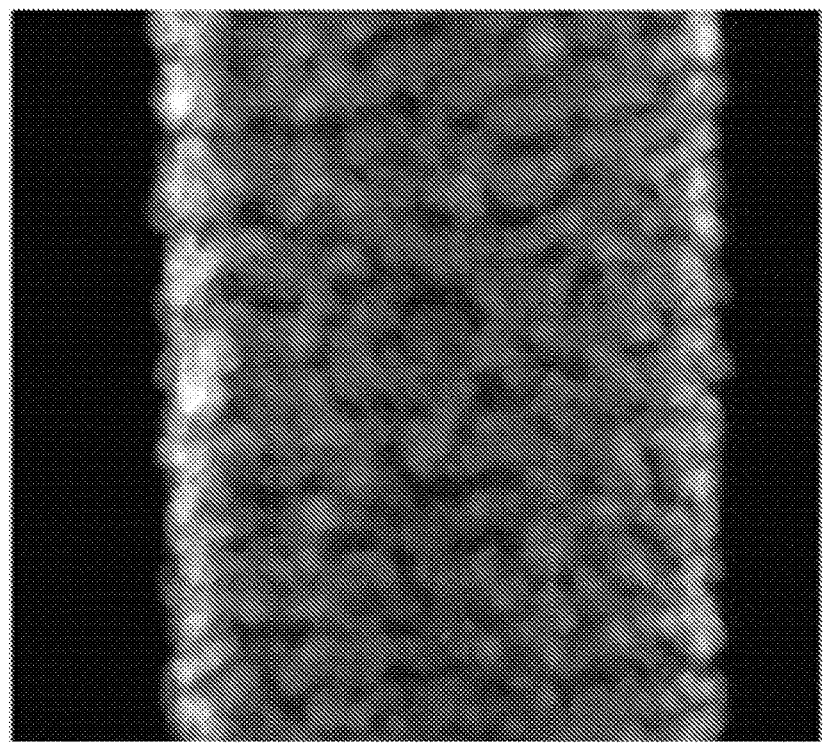
*Fig. 10*  10nm
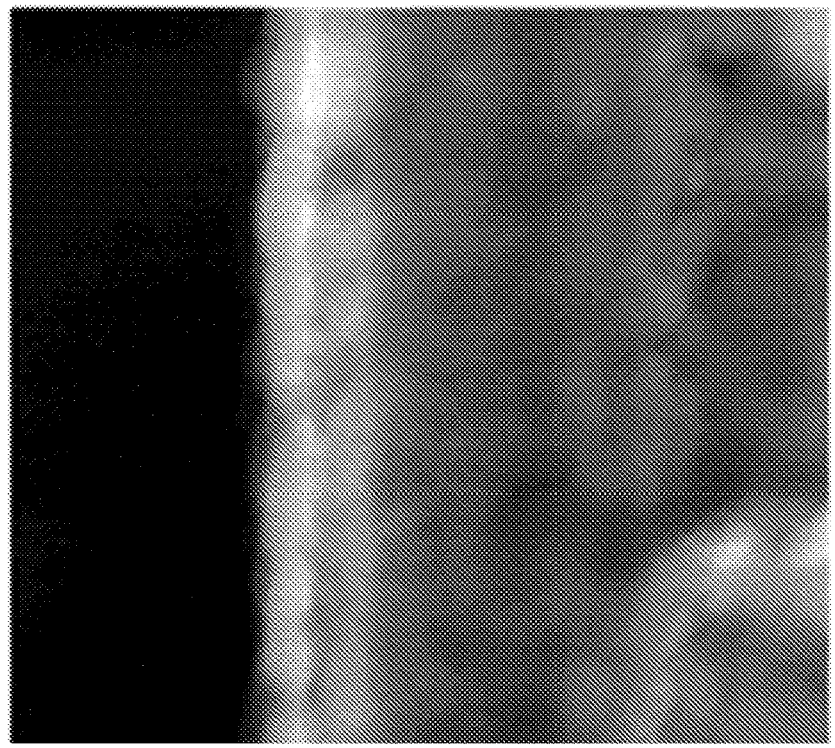
*Fig. 11*  10nm

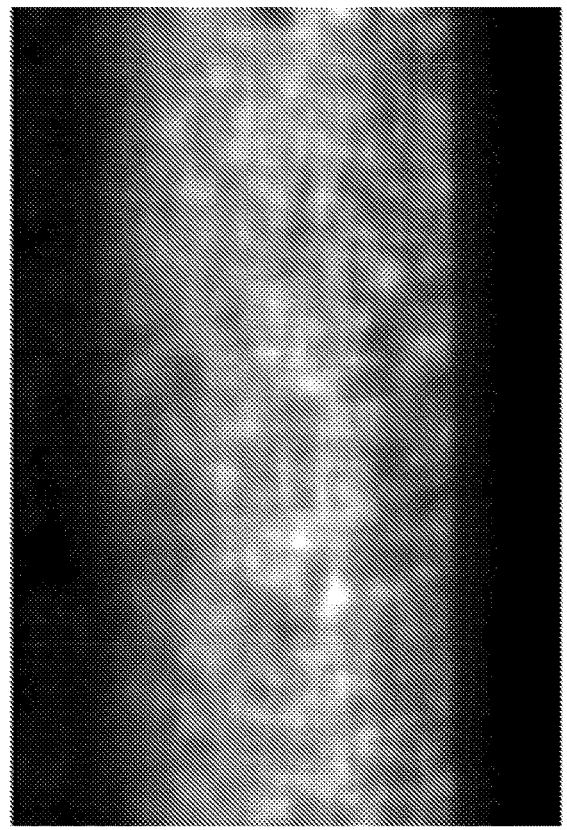
*Fig. 12*
*Fig. 13*

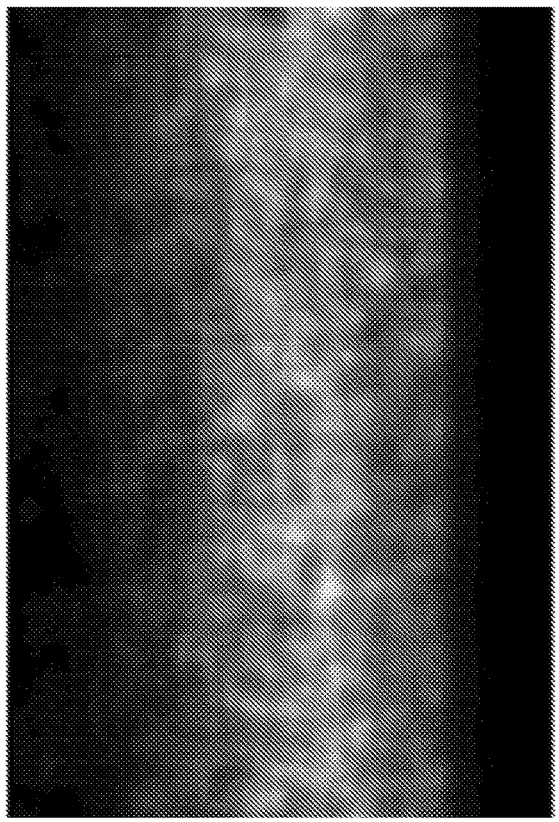 
Fig. 14
Fig. 15

CATALYST

CROSS REFERENCE TO RELATED APPLICATION

This application is the § 371 U.S. National Stage of International Application No. PCT/IB2019/053001, filed 11 Apr. 2019, which claims the benefit of U.S. Provisional Patent Application No. 62/657,189, filed Apr. 13, 2018, the disclosures of which are incorporated by reference herein in their entireties.

This invention was made with Government support under Contract No. DE-EE0007270 awarded by DOE. The Government has certain rights in this invention.

BACKGROUND

Fuel cells produce electricity via electrochemical oxidation of a fuel and reduction of an oxidant. Fuel cells are generally classified by the type of electrolyte and the type of fuel and oxidant reactants. One type of fuel cell is a polymer electrolyte membrane fuel cell (PEMFC), where the electrolyte is a polymeric ion conductor and the reactants are hydrogen fuel and oxygen as the oxidant. The oxygen is often provided from the ambient air.

PEMFCs typically require the use of electrocatalysts to improve the reaction rate of the hydrogen oxidation reaction (HOR) and oxygen reduction reactions (ORR), which improve the PEMFC performance. PEMFC electrocatalysts often comprise platinum, a relatively expensive precious metal. It is typically desirable to minimize the platinum content in PEMFC increasing the catalyst activity per unit catalyst surface area (specific activity) and increasing the catalyst surface area per catalyst mass (specific surface area or specific area). The HOR and ORR occur on the catalyst surface, so increasing the specific surface area and/or the specific activity can reduce the devices to minimize cost. Sufficient platinum content, however, is needed to provide sufficient catalytic activity and PEMFC device performance. As such, there is a desire to increase the catalyst activity per unit catalyst mass (mass activity). There are two general approaches to increase the mass activity, namely amount of catalyst needed to achieve a desired absolute performance, reducing cost.

To maximize specific area, PEMFC electrocatalysts are often in the form of nanometer-scale thin films or particles on support materials. An exemplary support material for nanoparticle PEMFC electrocatalysts is carbon black, and an exemplary support material for thin film electrocatalysts is whiskers.

To increase the specific activity, PEMFC Pt ORR electrocatalysts often also comprise certain transition metals such as cobalt or nickel. Without being bound by theory, incorporation of certain transition metals into the Pt lattice is believed to induce contraction of the Pt atoms at the catalyst surface, which increases the kinetic reaction rate by modification of the molecular oxygen binding and dissociation energies and the binding energies of reaction intermediates and/or spectator species.

PEMFC electrocatalysts may incorporate other precious metals. For example, HOR PEMFC Pt electrocatalysts can be alloyed with ruthenium to improve tolerance to carbon monoxide, a known Pt catalyst poison. HOR and ORR PEMFC electrocatalysts may also incorporate iridium to facilitate improved activity for the oxygen evolution reaction (OER). Improved OER activity may improve the durability of the PEMFC under inadvertent operation in the absence of fuel and during PEMFC system startup and shutdown. Incorporation of iridium with the PEMFC ORR electrocatalyst, however, may result in decreased mass activity and higher catalyst cost. Iridium has relatively lower specific activity for ORR than platinum, potentially resulting in decreased catalyst mass activity. Iridium is also a precious metal, and thereby its incorporation can increase cost. PEMFC Pt electrocatalysts may also incorporate gold which is also a precious metal and can increase cost. Gold is known to be relatively inactive for HOR and ORR in acidic electrolytes. Incorporation of gold can result in substantial deactivation for HOR and ORR due to the propensity for gold to preferentially segregate to the electrocatalyst surface, blocking active catalytic sites.

PEMFC electrocatalysts may have different structural and compositional morphologies. The structural and compositional morphologies are often tailored through specific processing methods during the electrocatalyst fabrication, such as variations in the electrocatalyst deposition method and annealing methods. PEMFC electrocatalysts can be compositionally homogenous, compositionally layered, or may contain composition gradients throughout the electrocatalyst. Tailoring of composition profiles within the electrocatalyst may improve the activity and durability of electrocatalysts. PEMFC electrocatalyst particles or nanometer-scale films may have substantially smooth surfaces or have atomic or nanometer scale roughness. PEMFC electrocatalysts may be structurally homogenous or may be nanoporous, being comprised of nanometer-scale pores and solid catalyst ligaments.

In PEMFC devices, electrocatalysts may lose performance over time due to a variety of degradation mechanisms, which induce structural and compositional changes. Such performance loss may shorten the practical lifetime of such systems. Electrocatalyst degradation may occur, for example, due to loss of electrocatalyst activity per unit surface area and loss of electrocatalyst surface area. Electrocatalyst specific activity may be lost, for example, due to the dissolution of electrocatalyst alloying elements. Nanoparticle and nano-scale thin film electrocatalysts may lose surface area, for example, due to Pt dissolution, particle sintering, agglomeration, and loss of surface roughness.

Additional electrocatalysts and systems containing such catalysts are desired, including those that address one or more of the issues discussed above.

SUMMARY

In one aspect, the present disclosure provides a catalyst comprising a Ta layer having an outer layer with a layer comprising Pt directly thereon, wherein the Ta layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.35 to 1.44) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.17 to 3.67, 0.17 to 2.99, 0.17 to 2.60, 0.17 to 2.20, 0.17 to 1.67, 0.17 to 1.47, 0.17 to 1.33, 0.17 to 1.17, 0.17 to 0.82, 0.17 to 0.73, 0.17 to 0.67, 0.17 to 0.50, 0.17 to 0.33, 0.50 to 2.60, 1.17 to 1.67, or even 0.73 to 3.67) nanometers, and wherein the Pt and Ta are present in an atomic ratio in a range from 0.01:1 to 10:1 (in some embodiments, in a range from 0.28:1 to 9.04:1, 1.74:1 to 9.04:1, 0.98:1 to 1.41:1, or even 1.16:1 to 2.80:1). In some embodiments, the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the Ta layer.

In another aspect, the present disclosure provides a method of making catalyst described herein, the method comprising depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, the method further comprises annealing at least one of the layers.

In another aspect, the present disclosure provides an article comprising nanostructured elements comprising microstructured whiskers having an outer surface having catalyst described herein thereon. In some embodiments of the articles, the first layer is directly on the microstructured whiskers.

In another aspect, the present disclosure provides a method of making an article described herein, the method comprising depositing any of the layers onto microstructured whiskers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, the method further comprises annealing at least one of the layers.

In another aspect, the present disclosure provides a method for making catalyst of described herein, the method comprising electrochemically cycling the catalyst.

Surprisingly, incorporation of a layer of Ta beneath a layer of ORR electrocatalyst can result in improved mass activity, specific surface area, and fuel cell performance of the ORR electrocatalyst.

Catalysts described herein are useful, for example, in fuel cell membrane electrode assemblies.

BRIEF DESCRIPTION OF DRAWINGS

FIG. 10 is a High Angle Annular Dark Field Transmission Electron Micrograph of Example 4 catalyst at 1,000,000× magnification, after deposition of the catalyst onto the optional support whisker.

FIG. 11 is a High Angle Annular Dark Field Transmission Electron Micrograph of Example 4 catalyst at 1,000,000× magnification, after annealing the catalyst.

FIG. 12 is a High Angle Annular Dark Field Transmission Electron Micrograph of Example 4 catalyst at 1,000,000× magnification, after testing the catalyst in fuel cell.

FIG. 13 is an Energy Dispersive X-Ray Spectroscopy elemental map for platinum and tantalum content of Example 4 catalyst at 1,500,000× magnification, after testing the catalyst in fuel cell.

FIG. 14 is an Energy Dispersive X-Ray Spectroscopy elemental map for tantalum content of Example 4 catalyst at 1,500,000× magnification, after testing the catalyst in fuel cell.

FIG. 15 is an Energy Dispersive X-Ray Spectroscopy elemental map for platinum content of Example 4 catalyst at 1,500,000× magnification, after testing the catalyst in fuel cell.

DETAILED DESCRIPTION

Figure 1:
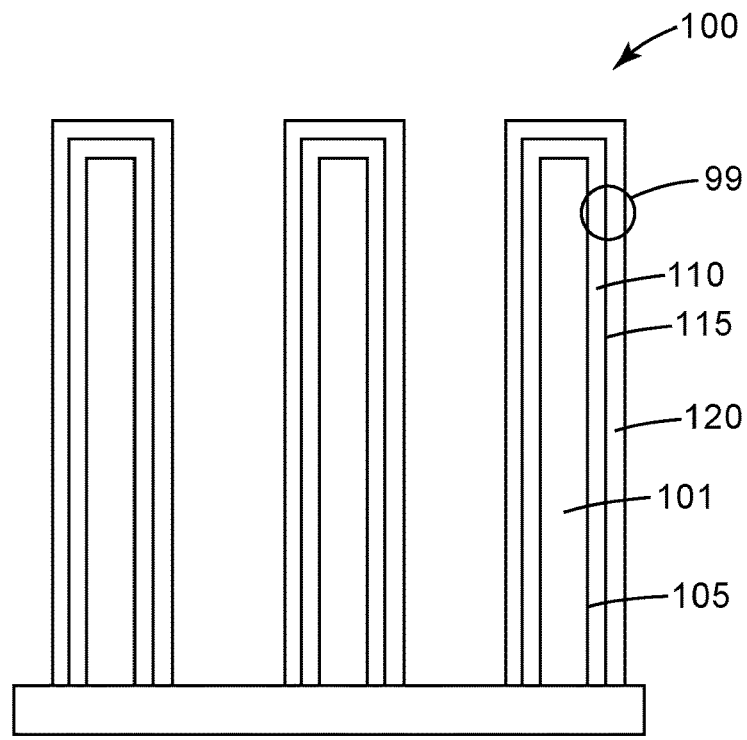
FIG. 1 is a side view of an exemplary catalyst described herein.

In some embodiments, the Ta layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 00.05 to 2, or even 0.35 to 1.44) nanometers. In some embodiments, the layer comprising Pt has an average thickness in a range from 0.04 to 40, 0.04 to 30, 0.04 to 20, 0.04 to 10, 0.04 to 5, 0.04 to 4, 0.17 to 3.67, 0.17 to 2.99, 0.17 to 2.60, 0.17 to 2.20, 0.17 to 1.67, 0.17 to 1.47, 0.17 to 1.33, 0.17 to 1.17, 0.17 to 0.82, 0.17 to 0.73, 0.17 to 0.67, 0.17 to 0.50, 0.17 to 0.33, 0.50 to 2.60, 1.17 to 1.67, or even 0.73 to 3.67) nanometers.

In some embodiments, the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the Ta layer.

In some embodiments, the layer comprising Pt comprises Pt crystallites with an FCC lattice constant in a range from 0.395 to 0.392 nanometer. In some embodiments, the layer comprising Pt comprises Pt crystallites with a crystallite size in a range from 2 to 20 (in some embodiments, in a range from 5 to 10 or even 5 to 9.3) nanometers.

In some embodiments, the catalyst material further comprises at least one pair of alternating layers, wherein the first alternating layer comprises Ta, and wherein the second alternating layer comprises Pt.

In some embodiments, the catalyst further comprises nanoscopic metal crystallites extending from the surface of the catalyst. In some embodiments, the surface metal crystallites comprise at least 10 (in some embodiments, at least 15, 20, 25, 30, 40, 50, 60, 70, 75, 80, 90, 95, 98, 99, or even at least 99.9) atomic % Ir. In some embodiments, the surface metal crystallites have a length in a range from 0.25 to 10 (in some embodiments, in a range from 0.25 to 8, 0.25 to 6, 0.25 to 4, 25 to 3, 0.25 to 2, 0.25 to 1, 1 to 10, 1 to 8, 1 to 6, 1 to 4, 1 to 3, or even in a range from 1 to 2) nanometers. In some embodiments, the surface metal crystallites have lengths less than 8 (in some embodiments, less than 7, 6, 5, 4, 3, 2, or even less than 1) nanometers. In some embodiments, the surface metal crystallites have diameters in a range from 0.25 to 5 (in some embodiments, in a range from 0.25 to 4, 0.25 to 3, 0.25 to 2, 0.25 to 1, 1 to 5, 1 to 4, 1 to 3, or even in a range from 1 to 2) nanometers. In some embodiments, the surface metal crystallites have diameters less than 5 (in some embodiments, less than 4, 3, 2, or even a diameter less than 1) nanometers.

In some embodiments, a layer of Ir is present between the Ta and Pt layers, and wherein the layer comprising Ir has an average thickness on the microstructured whiskers in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, 0.04 to 0.63, 0.04 to 0.32, 0.04 to 0.16, or even 0.16 to 0.63) nanometers. In some embodiments, the Ta to Ir atomic ratio is in a range from 0.01:1 to 100:1 (in some embodiments, in a range from 0.1:1 to 9:1, 0.33:1 to 3:1, 0.5:1 to 2:1, or even 0.59:1 to 2.35:1).

In some embodiments, the layer comprising Pt further comprises Ni. In some embodiments, the Pt to Ni atomic ratio is in a range from 0.5:1 to 5:1 (in some embodiments, in a range from 0.5:1 to 2:1, 0.5:1 to 1:1, 0.57:1 to 0.69:1, or even 0.60:1).

In some embodiments, the catalyst material comprises nanostructured elements comprising microstructured whiskers having an outer surface having a Ta layer thereon, the Ta layer having an outer layer with a layer comprising Pt directly thereon. In some embodiments, the Ta layer is directly on the microstructured whiskers. In some embodiments, the catalyst material further comprises at least one pair of alternating layers disposed between the outer surface of the microstructured whiskers and the layer comprising Ta, wherein the first alternating layer comprises Ta and is directly on the microstructured whiskers, and wherein the second alternating layer comprises Pt.

Referring to FIG. 1, exemplary catalyst described herein 99 comprises Ta layer 110 has outer layer 115 with layer 120 comprising Pt directly thereon (i.e., directly on outer layer 115). Ta layer 110 has an average thickness on the microstructured whiskers in a range from 0.04 to 30 nanometers. Layer 120 comprising Pt has an average thickness on microstructured whiskers 101 in a range from 0.04 to 50 nanometers. The Pt and Ta are present in an atomic ratio in a range from 0.01:1 to 10:1. As shown, optional nanostructured elements 100 comprises microstructured whiskers 101 having outer surface 105 with Ta layer 110 thereon (i.e., on outer surface 105).

In some embodiments, the microstructured whiskers are attached to a backing (e.g., a membrane). In some embodiments, wherein the backing has a microstructure on at least one of its surfaces.

Suitable whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, microstructured whiskers can be provided, for example, by vacuum depositing (e.g., by sublimation) a layer of organic or inorganic material onto a substrate (e.g., a microstructured catalyst transfer polymer sheet), and then, in the case of perylene red deposition, converting the perylene red pigment into microstructured whiskers by thermal annealing. Typically, the vacuum deposition steps are carried out at total pressures at or below about $10^{-3}$ Torr or 0.1 Pascal. Exemplary microstructures are made by thermal sublimation and vacuum annealing of the organic pigment C.I. Pigment Red 149 (i.e., N,N'-di(3, 5-xylyl)perylene-3,4:9,10-bis(dicarboximide)). Methods for making organic microstructured layers are reported, for example, in Materials Science and Engineering, A158 (1992), pp. 1-6; J. Vac. Sci. Technol. A, 5, (4), July/August 1987, pp. 1914-16; J. Vac. Sci. Technol. A, 6, (3), May/August 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are reported in the article "High Dispersion and Electrocatalytic Properties of Platinum on Well-Aligned Carbon Nanotube Arrays", Carbon, 42, (2004), pp. 191-197. Properties of catalyst layers using grassy or bristled silicon are reported, for example, in U.S. Pat. App. Pub. No. 2004/0048466 A1 (Gore et al.).

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum, which is then rotated over a sublimation or evaporation source for depositing the organic precursor (e.g., perylene red pigment) prior to annealing the organic precursor in order to form the whiskers.

Typically, the nominal thickness of deposited perylene red pigment is in a range from about 50 nm to 500 nm. Typically, the whiskers have an average cross-sectional dimension in a range from 20 nm to 60 nm, an average length in a range from 0.3 micrometer to 3 micrometers, and an areal number density in a range from 30 to 70 whiskers per square micrometer.

In some embodiments, the whiskers are attached to a backing. Exemplary backings comprise polyimide, nylon, metal foils, or other materials that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten, or more) times the average size of the whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the microstructure features extends above the average or majority of the microstructured peaks in a periodic fashion, such as every 31$^{st}$ V-groove peak being 25% or 50% or even 100% taller than those on either side of it. In some embodiments, this fraction of features that extends above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures, so much less of the microstructured material or whisker material is likely to be scraped or otherwise disturbed as the substrate moves through the coating process. In some embodiments, the microstructure features are substantially smaller than half the thickness of the membrane that the catalyst will be transferred to in making a membrane electrode assembly. This is so that during the catalyst transfer process, the taller microstructure features do not penetrate through the membrane where they may overlap the electrode on the opposite side of the membrane. In some embodiments, the tallest microstructure features are less than $\frac{1}{3}^{rd}$ or $\frac{1}{4}^{th}$ of the membrane thickness. For the thinnest ion exchange membranes (e.g., about 10 micrometers to 15 micrometers in thickness), it may be desirable to have a substrate with microstructured features no larger than about 3 micrometers to 4.5 micrometers tall. The steepness of the sides of the V-shaped or other microstructured features or the included angles between adjacent features may, in some embodiments, be desirable to be on the order of 90° for ease in catalyst transfer during a lamination-transfer process and to have a gain in surface area of the electrode that comes from the square root of two (1.414) surface area of the microstructured layer relative to the planar geometric surface of the substrate backing.

In general, the catalyst can be deposited by techniques known in the art. Exemplary deposition techniques include those independently selected from the group consisting of sputtering (including reactive sputtering), atomic layer deposition, metal organic chemical vapor deposition, molecular beam epitaxy, thermal physical vapor deposition, vacuum deposition by electrospray ionization, and pulse laser deposition. Additional general details can be found, for example, in U.S. Pat. No. 5,879,827 (Debe et al.), U.S. Pat. No. 6,040,077 (Debe et al.), and U.S. Pat. No. 7,419,741 (Vernstrom et al.), the disclosures of which are incorporated herein by reference. The thermal physical vapor deposition method uses suitable elevated temperature (e.g., via resistive heating, electron beam gun, or laser) to melt or sublimate the target (source material) into a vapor state, which is in turn passed through a vacuum space, then condensing of the vaporized form onto substrate surfaces. Thermal physical vapor deposition equipment is known in the art, including that available, for example, as a metal evaporator or as an organic molecular evaporator from CreaPhys GmbH, Dresden, Germany, under the trade designations "METAL EVAPORATOR (ME-SERIES)" or "ORGANIC MOLECULAR EVAPORATOR (DE-SERIES)" respectively; another example of an organic materials evaporator is available from Mantis Deposition LTD, Oxfordshire, UK, under the trade designation "ORGANIC MATERIALS EVAPORATIOR (ORMA-SERIES)." Catalyst material comprising multiple alternating layers can be sputtered, for example, from multiple targets (e.g., Pt is sputtered from a first target, Ni is sputtered from a second target, Ta from a third target, and Ir (if present) from a fourth target, or from a target(s) comprising more than one element (e.g., Pt and Ni)). It may be desirable that the coating layer be applied in a single step onto the gas distribution layer, gas dispersion layer, catalyst transfer layer, or membrane, so that the heat of condensation of the catalyst coating heats the underlying catalyst or support Pt, Ni, or Ta atoms as applicable and substrate surface sufficient to provide enough surface mobility that the atoms are well mixed and form thermodynamically stable alloy domains. In some embodiments, it may be desirable to maintain the catalyst as distinct layers, and deposition conditions can be tailored to minimize the mixing of atoms. Alternatively, for example, the substrate can also be provided hot or heated to facilitate this atomic mobility, or cold or cooled to reduce the atomic mobility. In some embodiments, sputtering is conducted at least in part in an atmosphere comprising argon. Organometallic forms of catalysts can be deposited, for example, by soft or reactive landing of mass selected ions. Soft landing of mass-selected ions is used to transfer catalytically-active metal complexes complete with organic ligands from the gas phase onto an inert surface. This method can be used to prepare materials with defined active sites and thus achieve molecular design of surfaces in a highly controlled way under either ambient or traditional vacuum conditions. For additional details see, for example, Johnson et al., Anal. Chem., 2010, 82, pp. 5718-5727, and Johnson et al., Chemistry: A European Journal, 2010, 16, pp. 14433-14438, the disclosures of which are incorporated herein by reference.

The planar equivalent thickness of an individual deposited catalyst layer is the thickness if deposited on a substantially flat, planar substrate. The planar equivalent thickness may depend, for example, on the areal catalyst loading of the layer and the catalyst density. For example, the planar equivalent thickness of a single layer of Pt with 10 micrograms of Pt per cm$^2$ planar area and density of 21.45 g/cm$^3$ deposited is calculated as 4.7 nm, the thickness of a Ni layer (8.90 g/cm$^3$) with the same areal loading is 11.2 nm, and the thickness of a Ta layer (16.4 g/cm$^3$) with the same areal loading is 6.1 nm. One or more layers can be deposited, resulting in a catalyst material with an overall planar equivalent thickness equal to the sum of each constituent layer's planar equivalent thickness.

In some embodiments, the catalyst material has a thickness that is the planar equivalent thickness of the catalyst material divided by the combined surface area of the whiskers and the backing. For example, a catalyst material with a planar equivalent thickness of 20 nm deposited onto a surface comprising microstructured whiskers on a planar backing with a combined surface area of 10 cm$^2$ of surface area per cm$^2$ of planar backing area will result in a catalyst thickness of 2 nm on the whisker. The surface area of the whiskers depends upon the whisker cross-sectional dimension, whisker length, and whisker areal number density (number of whiskers per unit area of backing). In some embodiments, the surface area of the whiskers is in a range from 1 to 100 cm$^2$ per cm$^2$ of backing surface area (in some embodiments, in a range from 2 to 50 cm$^2$ per cm$^2$, 5 to 25 cm$^2$ per cm$^2$, or even 5 to 15 cm$^2$ per cm$^2$). In some embodiments, the backing may have a surface area in a range of 1 to 10 cm$^2$ per cm$^2$ planar backing area (in some embodiments, in a range from 1 to 5 cm$^2$ per cm$^2$, or even in a range from 1 to 2 cm$^2$ per cm$^2$). The combined surface area of the whiskers and the backing is the product of the whisker surface area and the backing surface area. For example, whiskers which have a surface area of 10 cm$^2$ per cm$^2$ backing area on a backing which has a surface area of 1.5 cm² of surface area per cm² planar backing area, will yield a combined surface area of 15 cm² of combined surface area per cm² planar backing area.

In some embodiments, methods for making catalyst material herein comprise annealing the catalyst. In general, annealing can be done by techniques known in the art, including heating the catalyst material via, for example, in an oven or furnace, with a laser, and with infrared techniques. Annealing can be conducted, for example, in inert or reactive gas environments. Although not wanting to be bound by theory, it is believed annealing can induce structural changes on the atomic scale which can influence activity and durability of catalysts. Further, it is believed annealing nanoscale particles and films can induce mobility in the atomic constituent(s), which can cause growth of particles or thin film grains. In the case of multi-element mixtures, alloys, or layered particles and films, it is believed annealing can induce, for example, segregation of components within the particle or film to the surface, formation of random, disordered alloys, and formation of ordered intermetallics, depending upon the component element properties and the annealing environment. For additional details regarding annealing see, for example, van der Vliet et al., Nature Materials, 2012, 11, pp. 1051-1058; Wang et al., Nature Materials, 2013, 12, pp. 81-87, and U.S. Pat. No. 8,748,330 B2 (Debe et al.), the disclosures of which are incorporated herein by reference.

In some embodiments, the catalyst is essentially nonporous (i.e., the catalyst contains spherical and/or aspherical void volume, wherein the void volume is at least 75% contained within the catalyst thin film (in some embodiments, at least 85, 90, 95, 99, or even 100% contained within the catalyst thin film), and wherein the average diameter of the void volume is less than 1 nm (in some embodiments, less than 0.8 nm, 0.6 nm, 0.4 nm, 0.2 nm, or even 0.01 nm)).

In some embodiments, methods for making catalyst described herein comprise depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, methods for making catalyst described herein comprise annealing at least one of the layers.

In some embodiments, methods for making the catalyst described herein comprises electrochemically cycling the catalyst. In some embodiments, methods for making the catalyst described herein comprise cycling the catalyst in an acidic electrolyte. In some embodiments, methods for making the catalyst described herein comprise cycling the catalyst between 0.60 and 1.00 V versus the potential of a standard hydrogen electrode. Such techniques are generally known in the art (also see, for example, copending application having U.S. Ser. No. 62/657,184, filed Apr. 13, 2018, the disclosure of which is incorporated herein by reference.

In some embodiments, the microstructured whiskers are attached to a backing (e.g., a membrane). In some embodiments, wherein the backing has a microstructure on at least one of its surfaces.

Catalysts described herein are useful, for example, in fuel cell membrane electrode assemblies (MEAs). "Membrane electrode assembly" refers to a layered sandwich of fuel cell materials comprising a membrane, anode and cathode electrode layers, and gas diffusion layers. Typically, the cathode catalyst layer comprises a catalyst described herein, although in some embodiments, the anode catalyst layer independently comprises a catalyst described herein.

In some embodiments, an article comprises the catalyst described herein. In some embodiments, the article comprises no electrically conductive carbon-based material.

An MEA comprises, in order:
a first gas distribution layer having first and second opposed major surfaces;
an anode catalyst layer having first and second opposed major surfaces, the anode catalyst comprising a first catalyst;
an electrolyte membrane;
a cathode catalyst layer having first and second opposed major surfaces, the cathode catalyst comprising a second catalyst; and
a second gas distribution layer having first and second opposed major surfaces.

Electrolyte membranes conduct reaction intermediate ions between the anode and cathode catalyst layers. Electrolyte membranes preferably have high durability in the electrochemical environment, including chemical and electrochemical oxidative stability. Electrolyte membranes preferably have low ionic resistance for the transport of the reaction intermediate ions, but are relatively impermeable barriers for other ions, electrons, and reactant species. In some embodiments, the electrolyte membrane is a proton exchange membrane (PEM), which conducts cations. In PEM fuel cells, the electrolyte membrane preferably conducts protons. PEMs are typically a partially fluorinated or perfluorinated polymer comprised of a structural backbone and pendant cation exchange groups. PEMs are available, for example, from E. I. du Pont de Nemours and Company, Wilmington, DE, under the trade designation "NAFION;" Solvay, Brussels, Belgium, under the trade designation "AQUIVION;" 3M Company, St. Paul, MN, under the designation "3M PFSA MEMBRANE;" and Asahi Glass Co., Tokyo, Japan, under the trade designation "FLEMION."

A gas distribution layer generally delivers gas evenly to the electrodes and, in some embodiments, conducts electricity. It also provides for removal of water in either vapor or liquid form, in the case of a fuel cell. Gas distribution layers are typically porous to allow reactant and product transport between the electrodes and the flow field. Sources of gas distribution layers include carbon fibers randomly oriented to form porous layers, in the form of non-woven paper or woven fabrics. The non-woven carbon papers are available, for example, from Mitsubishi Rayon Co., Ltd., Tokyo, Japan, under the trade designation "GRAFIL U-105;" Toray Corp., Tokyo, Japan, under the trade designation "TORAY;" AvCarb Material Solutions, Lowell, MA, under the trade designation "AVCARB;" SGL Group, the Carbon Company, Wiesbaden, Germany, under the trade designation "SIGRACET;" Freudenberg FCCT SE & Co. KG, Fuel Cell Component Technologies, Weinheim, Germany, under the trade designation "FREUDENBERG;" and Engineered Fibers Technology (EFT), Shelton, CT, under the trade designation "SPECTRACARB GDL." The woven carbon fabrics or cloths are available, for example, from ElectroChem Inc., Woburn, MA, under the trade designations "EC-CC1-060" and "EC-AC-CLOTH;" NuVant Systems Inc., Crown Point, IN, under the trade designations "ELAT-LT" and "ELAT;" BASF Fuel Cell GmbH, North America, under the trade designation "E-TEK ELAT LT;" and Zoltek Corp., St. Louis, MO, under the trade designation "ZOLTEK CARBON CLOTH." The non-woven paper or woven fabrics can be treated to modify its hydrophobicity (e.g., treatment with a polytetrafluoroethylene (PTFE) suspension with subsequent drying and annealing). Gas dispersion layers often comprise a porous layer of sub-micrometer electronically-conductive particles (e.g., carbon), and a binder (e.g., PTFE). Although not wanting to be bound by theory, it is believed that gas dispersion layers facilitate reactant and product water transport between the electrode and the gas distribution layers.

At least one of the anode or cathode catalyst is catalyst described herein (i.e., a catalyst comprising a Ta layer, the Ta layer having an outer layer with a layer comprising Pt directly thereon, wherein the Ta layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.35 to 1.44) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.17 to 3.67, 0.17 to 2.99, 0.17 to 2.60, 0.17 to 2.20, 0.17 to 1.67, 0.17 to 1.47, 0.17 to 1.33, 0.17 to 1.17, 0.17 to 0.82, 0.17 to 0.73, 0.17 to 0.67, 0.17 to 0.50, 0.17 to 0.33, 0.50 to 2.60, 1.17 to 1.67, or even 0.73 to 3.67) nanometers, wherein the Pt and Ta are present in an atomic ratio in a range from 0.01:1 to 10:1 (in some embodiments, in a range from 0.28:1 to 9.04:1, from 1.74:1 to 9.04:1, 0.98:1 to 1.41:1, or even 1.16:1 to 2.80:1) In some embodiments wherein the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the Ta layer. The "other catalyst layer" can be a conventional catalyst known in the art, and provided by techniques known in the art (e.g., U.S. Pat. No. 5,759,944 (Buchanan et al.), U.S. Pat. No. 5,068,161 (Keck et al.), and U.S. Pat. No. 4,447,506 (Luczak et al.)), the disclosures of which are incorporated herein by reference.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

Figure 2:
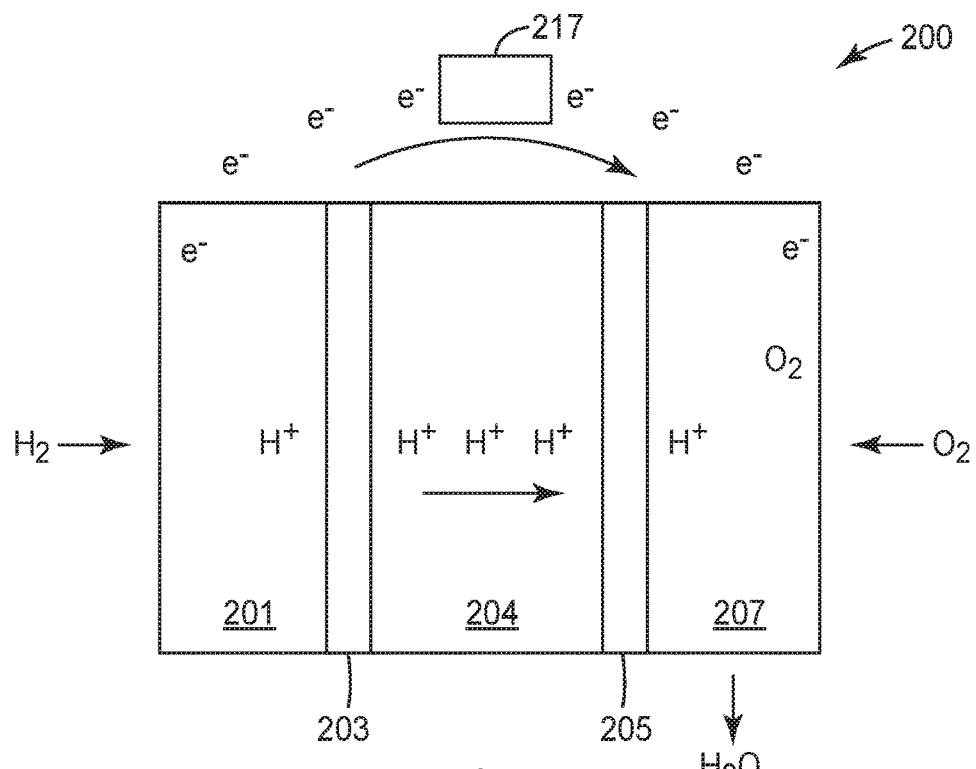
FIG. 2 is a schematic of an exemplary fuel cell.

Referring to FIG. 2, exemplary fuel cell 200 includes first gas distribution layer 201 adjacent to anode 203. Adjacent anode 203 is an electrolyte membrane 204. Cathode 205 is situated adjacent the electrolyte membrane 204, and second gas distribution layer 207 is situated adjacent cathode 205. In operation, hydrogen fuel is introduced into the anode portion of the fuel cell 200, passing through the first gas distribution layer 201 and over anode 203. At anode 203, the hydrogen fuel is separated into hydrogen ions (H$^+$) and electrons (e$^-$).

Electrolyte membrane 204 permits only the hydrogen ions or protons to pass through electrolyte membrane 204 to the cathode portion of fuel cell 200. The electrons cannot pass through the electrolyte membrane 204 and, instead, flow through an external electrical circuit in the form of electric current. This current can power an electric load 217, such as an electric motor, or be directed to an energy storage device, such as a rechargeable battery.

Oxygen flows into the cathode side of fuel cell 200 via second distribution layer 207. As the oxygen passes over cathode 205, oxygen, protons, and electrons combine to produce water and heat.

EXEMPLARY EMBODIMENTS

1A. A catalyst comprising a Ta layer having an outer layer with a layer comprising Pt directly thereon, wherein the Ta layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.35 to 1.44) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.17 to 3.67, 0.17 to 2.99, 0.17 to 2.60, 0.17 to 2.20, 0.17 to 1.67, 0.17 to 1.47, 0.17 to 1.33, 0.17 to 1.17, 0.17 to 0.82, 0.17 to 0.73, 0.17 to 0.67, 0.17 to 0.50, 0.17 to 0.33, 0.50 to 2.60, 1.17 to 1.67, or even 0.73 to 3.67) nanometers, and wherein the Pt and Ta are present in an atomic ratio in a range from 0.01:1 to 10:1 (in some embodiments, in a range from 0.28:1 to 9.04:1, from 1.74:1 to 9.04:1, 0.98:1 to 1.41:1, or even 1.16:1 to 2.80:1).

2A. The catalyst of Exemplary Embodiment 1A, wherein the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the Ta layer.

3A. The catalyst of either Exemplary Embodiment 1A or 2A, further comprising at least one pair of alternating layers, wherein the first alternating layer comprises Ta, and wherein the second alternating layer comprises Pt.

4A. The catalyst of any preceding A Exemplary Embodiment, wherein a layer of Ir is present between the Ta and Pt layers, and wherein the layer comprising Ir has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, 0.04 to 0.63, 0.04 to 0.32, 0.04 to 0.16, or even 0.16 to 0.63) nanometers.

5A. The catalyst of Exemplary Embodiment 4A, wherein the Ta to Ir atomic ratio is in a range from 0.01:1 to 100:1 (in some embodiments, in a range from 0.1:1 to 9:1, 0.33:1 to 3:1, 0.5:1 to 2:1, or even 0.59:1 to 2.35:1).

6A. The catalyst of any preceding A Exemplary Embodiment, wherein the layer comprising Pt comprises Pt crystallites with an FCC lattice constant in a range from 0.395 to 0.392 nanometer.

7A. The catalyst of any preceding A Exemplary Embodiment, wherein the layer comprising Pt comprises Pt crystallites with a crystallite size in a range from 2 to 20 (in some embodiments, in a range from 5 to 10 or even 5 to 9.3) nanometers.

8A. The catalyst of any preceding A Exemplary Embodiment, wherein the layer comprising Pt further comprises Ni.

9A. The catalyst of Exemplary Embodiment 8A, wherein the Pt to Ni atomic ratio is in a range from 0.5:1 to 5:1 (in some embodiments, in a range from 0.5:1 to 2:1, 0.5:1 to 1:1, 0.57:1 to 0.69:1, or even 0.60:1).

1B. A method of making the catalyst of any preceding A Exemplary Embodiment, the method comprising depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition.

1C. An article comprising nanostructured elements comprising microstructured whiskers having an outer surface having the catalyst of any preceding A Exemplary Embodiment thereon.

2C. The article of Exemplary Embodiment 1C, wherein the Ta layer is directly on the microstructured whiskers.

3C. The article of either Exemplary Embodiment 1C or 2C, further comprising at least one pair of alternating layers disposed between the outer surface of the microstructured whiskers and the layer comprising Ta, wherein the first alternating layer comprises Ta and is directly on the microstructured whiskers, and wherein the second alternating layer comprises Pt.

4C. The article of any preceding C Exemplary Embodiment, wherein the microstructured whiskers are attached to a backing (e.g., a membrane).

5C. The article of Exemplary Embodiment 4C, wherein the backing has a microstructure on at least one of its surfaces.

6C. The article according to any preceding C Exemplary Embodiment which comprises no electrically conductive carbon-based material.

1D. A method of making the article of any preceding C Exemplary Embodiment, the method comprising depositing any of the layers onto microstructured whiskers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition.

2D. The method of Exemplary Embodiment 1D, further comprising annealing at least one of the layers.

1E. A method for making the catalyst of any preceding A Exemplary Embodiment, the method comprising electrochemically cycling the catalyst.

2E. The method of Exemplary Embodiment 1E, further comprising cycling the catalyst in an acidic electrolyte.

3E. The method of either Exemplary Embodiment 1E or 2E, further comprising cycling the catalyst in a range from 0.60 to 1.00 V versus the potential of a standard hydrogen electrode.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Preparatory Example A

Microstructured whiskers employed as catalyst supports were made according to the process described in U.S. Pat. No. 5,338,430 (Parsonage et al.), U.S. Pat. No. 4,812,352 (Debe), and U.S. Pat. No. 5,039,561 (Debe), incorporated herein by reference, using as substrates the microstructured catalyst transfer substrates (or MCTS) described in U.S. Pat. No. 6,136,412 (Spiewak et al.), also incorporated herein by reference. Perylene red pigment (i.e., N,N'-di(3,5-xylyl) perylene-3,4:9,10-bis(dicarboximide)) (C.I. Pigment Red 149, also known as "PR149", obtained from Clariant, Charlotte, NC) was sublimation vacuum coated onto MCTS with a nominal thickness of 200 nm, after which it was annealed. After deposition and annealing, highly oriented crystal structures were formed with large aspect ratios, controllable lengths of about 0.5 to 2 micrometers, widths of about 0.03-0.05 micrometer and areal number density of about 30 whiskers per square micrometer, oriented substantially normal to the underlying substrate.

Comparative Example A

Nanostructured thin film (NSTF) catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and a 5-inch× 15-inch (12.7 cm×38.1 cm) rectangular Pt sputter target. The system base pressure was typically $2.5 \times 10^{-5}$ Torr (0.0033 Pa), and the typically determined background gas was water vapor. The coatings were deposited by using ultra high purity Ar as the sputtering gas.

A single Pt layer with planar equivalent thickness of about 0.09 nm was first deposited onto the whiskers on MCTS from a pure Pt target. The Pt deposition process was repeated 50 times. The resultant deposition consisted of a single, contiguous Pt thin film with an overall contiguous Pt planar equivalent thickness of about 4.7 nm, summarized in Table 1, below.

TABLE 1

| Example | Structure | Contiguous Planar Equivalent Thickness, nm | | | | |
|---|---|---|---|---|---|---|
| | | Pt | Ni | Ta | Ir | All |
| Comparative Example A | Pt | 4.7 | 0 | 0 | 0 | 4.7 |
| Comparative Example B | Pt | 9.3 | 0 | 0 | 0 | 9.3 |
| Comparative Example C | Pt | 11.7 | 0 | 0 | 0 | 11.7 |
| Comparative Example D | Pt | 23.3 | 0 | 0 | 0 | 23.3 |
| Comparative Example E | Pt | 46.6 | 0 | 0 | 0 | 46.6 |
| Example 1 | Pt/Ta | 2.3 | 0.0 | 4.9 | 0.0 | 7.2 |
| Example 2 | Pt/Ta | 4.7 | 0.0 | 4.9 | 0.0 | 9.5 |
| Example 3 | Pt/Ta | 7.0 | 0.0 | 4.9 | 0.0 | 11.9 |
| Example 4 | Pt/Ta | 9.3 | 0.0 | 4.9 | 0.0 | 14.2 |
| Example 5 | Pt/Ta | 18.6 | 0.0 | 4.9 | 0.0 | 23.5 |
| Example 6 | Pt/Ta | 23.3 | 0.0 | 4.9 | 0.0 | 28.2 |
| Example 7 | Pt/Ta | 36.4 | 0.0 | 4.9 | 0.0 | 41.2 |
| Example 8 | Pt/Ta | 4.7 | 0.0 | 20.1 | 0.0 | 24.8 |
| Example 9 | Pt/Ta | 9.3 | 0.0 | 20.1 | 0.0 | 29.4 |
| Example 10 | Pt/Ta | 16.3 | 0.0 | 20.1 | 0.0 | 36.4 |
| Example 11 | Pt/Ta | 23.3 | 0.0 | 20.1 | 0.0 | 43.4 |
| Example 12 | PtNi/Ta | 4.7 | 5.6 | 4.9 | 0.0 | 15.2 |
| Example 13 | PtNi/Ta | 9.3 | 11.2 | 4.9 | 0.0 | 25.4 |
| Example 14 | PtNi/Ta | 14.0 | 16.8 | 4.9 | 0.0 | 35.7 |
| Example 15 | PtNi/Ta | 23.3 | 28.1 | 4.9 | 0.0 | 56.3 |

TABLE 1-continued

| | | Contiguous Planar Equivalent Thickness, nm | | | | |
|---|---|---|---|---|---|---|
| Example | Structure | Pt | Ni | Ta | Ir | All |
| Example 16 | Pt/Ir/Ta | 4.7 | 0.0 | 4.9 | 2.2 | 11.8 |
| Example 17 | Pt/Ir/Ta | 4.7 | 0.0 | 4.9 | 4.4 | 14.0 |
| Example 18 | Pt/Ir/Ta | 4.7 | 0.0 | 4.9 | 8.9 | 18.4 |

The areal Pt loading of a Pt layer is determined by multiplying the planar equivalent thickness by the density of the layer. The areal Pt loading of Comparative Example A, summarized in Table 2, below, is 10 micrograms per cm² planar area, determined by multiplying 4.7 nm by the density of Pt, 2.145 micrograms per nm³. Comparative Example A did not contain Ni, Ta, or Ir, and the Pt mole fraction was 1.00.

TABLE 2

| | Target Loading, microgram/cm² | | | | Target Mole Fraction | | | | Target Pt:Ta Atomic Ratio | Target Pt:Ni Atomic Ratio | Target Ir:Ta Atomic Ratio |
|---|---|---|---|---|---|---|---|---|---|---|---|
| Example | Pt | Ni | Ta | Ir | Pt | Ni | Ta | Ir | | | |
| Comparative Example A | 10 | 0 | 0 | 0 | 1.00 | 0 | 0 | 0 | Infinite | Infinite | 0 |
| Comparative Example B | 20 | 0 | 0 | 0 | 1.00 | 0 | 0 | 0 | Infinite | Infinite | 0 |
| Comparative Example C | 25 | 0 | 0 | 0 | 1.00 | 0 | 0 | 0 | Infinite | Infinite | 0 |
| Comparative Example D | 50 | 0 | 0 | 0 | 1.00 | 0 | 0 | 0 | Infinite | Infinite | 0 |
| Comparative Example E | 100 | 0 | 0 | 0 | 1.00 | 0 | 0 | 0 | Infinite | Infinite | 0 |
| Example 1 | 5 | 0 | 8 | 0 | 0.37 | 0.00 | 0.63 | 0.00 | 0.58 | Infinite | 0 |
| Example 2 | 10 | 0 | 8 | 0 | 0.54 | 0.00 | 0.46 | 0.00 | 1.16 | Infinite | 0 |
| Example 3 | 15 | 0 | 8 | 0 | 0.63 | 0.00 | 0.37 | 0.00 | 1.74 | Infinite | 0 |
| Example 4 | 20 | 0 | 8 | 0 | 0.70 | 0.00 | 0.30 | 0.00 | 2.32 | Infinite | 0 |
| Example 5 | 40 | 0 | 8 | 0 | 0.82 | 0.00 | 0.18 | 0.00 | 4.64 | Infinite | 0 |
| Example 6 | 50 | 0 | 8 | 0 | 0.85 | 0.00 | 0.15 | 0.00 | 5.80 | Infinite | 0 |
| Example 7 | 78 | 0 | 8 | 0 | 0.90 | 0.00 | 0.10 | 0.00 | 9.04 | Infinite | 0 |
| Example 8 | 10 | 0 | 33 | 0 | 0.22 | 0.00 | 0.78 | 0.00 | 0.28 | Infinite | 0 |
| Example 9 | 20 | 0 | 33 | 0 | 0.36 | 0.00 | 0.64 | 0.00 | 0.56 | Infinite | 0 |
| Example 10 | 35 | 0 | 33 | 0 | 0.50 | 0.00 | 0.50 | 0.00 | 0.98 | Infinite | 0 |
| Example 11 | 50 | 0 | 33 | 0 | 0.58 | 0.00 | 0.42 | 0.00 | 1.41 | Infinite | 0 |
| Example 12 | 10 | 5 | 8 | 0 | 0.28 | 0.47 | 0.24 | 0.00 | 1.16 | 0.60 | 0 |
| Example 13 | 20 | 10 | 8 | 0 | 0.32 | 0.54 | 0.14 | 0.00 | 2.32 | 0.60 | 0 |
| Example 14 | 30 | 15 | 8 | 0 | 0.34 | 0.56 | 0.10 | 0.00 | 3.48 | 0.60 | 0 |
| Example 15 | 50 | 25 | 8 | 0 | 0.35 | 0.59 | 0.06 | 0.00 | 5.80 | 0.60 | 0 |
| Example 16 | 10 | 0 | 8 | 5 | 0.42 | 0.00 | 0.36 | 0.21 | 1.16 | Infinite | 0.59 |
| Example 17 | 10 | 0 | 8 | 10 | 0.35 | 0.00 | 0.30 | 0.35 | 1.16 | Infinite | 1.18 |
| Example 18 | 10 | 0 | 8 | 20 | 0.26 | 0.00 | 0.22 | 0.52 | 1.16 | Infinite | 2.35 |

The metal was deposited onto the NSTF support-coated MCTS substrate, which has intrinsic roughness. The thickness of the metal film on the support is thinner than the planar equivalent thickness by the factor of the overall support and substrate roughness factor. The NSTF support is estimated to provide 10 cm² of surface area per cm² of planar area, and the MCTS provided an additional 1.4 cm² of surface area, and as such the overall surface area was 14 cm². 4.7 nm planar equivalent thickness spread over 14 cm²/cm² was about 0.33 nm. The metal thickness on the support of Comparative Example A is summarized in Table 3, below.

TABLE 3

| | Contiguous Thickness on Support, nm | | | | |
|---|---|---|---|---|---|
| Example | Pt | Ni | Ta | Ir | All |
| Comparative Example A | 0.33 | 0.00 | 0.00 | 0.00 | 0.33 |
| Comparative Example B | 0.67 | 0.00 | 0.00 | 0.00 | 0.67 |
| Comparative Example C | 0.83 | 0.00 | 0.00 | 0.00 | 0.83 |

TABLE 3-continued

| | Contiguous Thickness on Support, nm | | | | |
|---|---|---|---|---|---|
| Example | Pt | Ni | Ta | Ir | All |
| Comparative Example D | 1.67 | 0.00 | 0.00 | 0.00 | 1.67 |
| Comparative Example E | 3.33 | 0.00 | 0.00 | 0.00 | 3.33 |

TABLE 3-continued

| | Contiguous Thickness on Support, nm | | | | |
|---|---|---|---|---|---|
| Example | Pt | Ni | Ta | Ir | All |
| Example 1 | 0.17 | 0.00 | 0.35 | 0.00 | 0.51 |
| Example 2 | 0.33 | 0.00 | 0.35 | 0.00 | 0.68 |
| Example 3 | 0.50 | 0.00 | 0.35 | 0.00 | 0.85 |
| Example 4 | 0.67 | 0.00 | 0.35 | 0.00 | 1.01 |
| Example 5 | 1.33 | 0.00 | 0.35 | 0.00 | 1.68 |
| Example 6 | 1.67 | 0.00 | 0.35 | 0.00 | 2.01 |
| Example 7 | 2.60 | 0.00 | 0.35 | 0.00 | 2.95 |
| Example 8 | 0.33 | 0.00 | 1.44 | 0.00 | 1.77 |
| Example 9 | 0.67 | 0.00 | 1.44 | 0.00 | 2.10 |
| Example 10 | 1.17 | 0.00 | 1.44 | 0.00 | 2.60 |
| Example 11 | 1.67 | 0.00 | 1.44 | 0.00 | 3.10 |
| Example 12 | 0.33 | 0.40 | 0.35 | 0.00 | 1.08 |
| Example 13 | 0.67 | 0.80 | 0.35 | 0.00 | 1.82 |
| Example 14 | 1.00 | 1.20 | 0.35 | 0.00 | 2.55 |
| Example 15 | 1.67 | 2.00 | 0.35 | 0.00 | 4.02 |
| Example 16 | 0.33 | 0.00 | 0.35 | 0.16 | 0.84 |
| Example 17 | 0.33 | 0.00 | 0.35 | 0.32 | 1.00 |
| Example 18 | 0.33 | 0.00 | 0.35 | 0.63 | 1.31 |

Representative areas of the electrocatalyst were analyzed for bulk composition using X-Ray Fluorescence spectroscopy (XRF). Representative catalyst samples were evaluated on MCTS using a wavelength dispersive X-ray fluorescence spectrometer (obtained under the trade designation "PRIMUS II" from Rigaku Corporation, Tokyo, Japan) equipped with a rhodium (Rh) X-ray source, a vacuum atmosphere, and a 20-mm diameter measurement area. Each sample was analyzed three times to obtain the average and standard deviation for the measured Pt, Ni, Ta, and Ir signal intensities, which are proportional to loading. The electrocatalyst's Pt, Ni, Ta, and Ir loadings were determined by comparing their measured XRF intensities to the XRF intensities obtained with standard NSTF electrocatalysts containing Pt, Ni, Ta, and Ir with known areal loadings. From the XRF-determined Pt, Ni, Ta, and Ir loadings, the catalyst's composition was calculated. Loading and composition information for Comparative Example A is provided in Table 4, below. Comparative Example A contained 13.6 micrograms/cm$^2$ of Pt, and did not contain measurable Ta, Ni or Ir.

catalyst coated whiskers embedded into either side of the PEM. The CCM was installed with identical gas diffusion layers (obtained under the trade designation "3M 2979 GAS DIFFUSION LAYERS" from 3M Company) on the anode and cathode in 50 cm$^2$ active area test cells (obtained under the trade designation "50 CM$^2$ CELL HARDWARE" from Fuel Cell Technologies, Inc., Albuquerque, NM) with quad-serpentine flow fields with gaskets selected to give 10% compression of the gas diffusion layers. Comparative Example A catalyst was evaluated as the fuel cell cathode.

After assembly, the test cells were connected to a test station (obtained under the trade designation "SINGLE FUEL CELL TEST STATION" from Fuel Cell Technologies, Inc.). The MEA was then operated for about 40 hours under a conditioning protocol to achieve apparent steady state performance. The protocol consisted of repeated cycles of operational and shutdown phases, each about 40 and 45 minutes in duration, respectively. In the operational phase, the MEA was operated at 75° C. cell temperature, 70° C. dewpoint, 101/101 kPaA H$_2$/Air, with constant flow rates of

TABLE 4

| Example | Loading, microgram/cm$^2$ | | | | Mole Fraction | | | | Pt:Ta Atomic Ratio | Pt:Ni Atomic Ratio | Ir:Ta Atomic Ratio |
| --- | --- | --- | --- | --- | --- | --- | --- | --- | --- | --- | --- |
| | Pt | Ni | Ta | Ir | Pt | Ni | Ta | Ir | | | |
| Comparative Example A | 13.6 | — | — | — | 1 | 0 | 0 | 0 | Infinite | Infinite | 0 |
| Comparative Example B | 23.8 | — | — | — | 1 | 0 | 0 | 0 | Infinite | Infinite | 0 |
| Comparative Example C | 27.0 | — | — | — | 1 | 0 | 0 | 0 | Infinite | Infinite | 0 |
| Comparative Example D | 54.2 | — | — | — | 1 | 0 | 0 | 0 | Infinite | Infinite | 0 |
| Comparative Example E | 98.1 | — | — | — | 1 | 0 | 0 | 0 | Infinite | Infinite | 0 |
| Example 1 | 4.3 | — | 7.5 | — | 0.31 | 0.00 | 0.59 | 0.00 | 0.53 | Infinite | 0 |
| Example 2 | 10.0 | — | 5.8 | — | 0.53 | 0.00 | 0.34 | 0.00 | 1.58 | Infinite | 0 |
| Example 3 | 15.4 | — | 7.4 | — | 0.65 | 0.00 | 0.34 | 0.00 | 1.93 | Infinite | 0 |
| Example 4 | 22.8 | — | 7.6 | — | 0.80 | 0.00 | 0.28 | 0.00 | 2.80 | Infinite | 0 |
| Example 5 | 39.6 | — | 7.5 | — | 0.81 | 0.00 | 0.17 | 0.00 | 4.91 | Infinite | 0 |
| Example 6 | 56.4 | — | 7.4 | — | 0.96 | 0.00 | 0.14 | 0.00 | 7.03 | Infinite | 0 |
| Example 7 | 83.3 | — | 7.9 | — | 0.96 | 0.00 | 0.10 | 0.00 | 9.75 | Infinite | 0 |
| Example 8 | 10.5 | — | 36.3 | — | 0.23 | 0.00 | 0.86 | 0.00 | 0.27 | Infinite | 0 |
| Example 9 | 22.2 | — | 34.8 | — | 0.40 | 0.00 | 0.67 | 0.00 | 0.59 | Infinite | 0 |
| Example 10 | 39.3 | — | 36.3 | — | 0.56 | 0.00 | 0.55 | 0.00 | 1.00 | Infinite | 0 |
| Example 11 | 55.4 | — | 35.2 | — | 0.65 | 0.00 | 0.44 | 0.00 | 1.46 | Infinite | 0 |
| Example 12 | 9.3 | 5.2 | 7.3 | — | 0.26 | 0.49 | 0.22 | 0.00 | 1.18 | 0.54 | 0 |
| Example 13 | 20.4 | 9.6 | 7.2 | — | 0.33 | 0.52 | 0.13 | 0.00 | 2.62 | 0.64 | 0 |
| Example 14 | 31.9 | 14.6 | 7.5 | — | 0.36 | 0.55 | 0.09 | 0.00 | 3.94 | 0.66 | 0 |
| Example 15 | 53.3 | 23.3 | 7.3 | — | 0.38 | 0.55 | 0.06 | 0.00 | 6.74 | 0.69 | 0 |
| Example 16 | 10.5 | — | 7.9 | 5.2 | 0.44 | 0.00 | 0.36 | 0.22 | 1.23 | Infinite | 0.62 |
| Example 17 | 10.3 | — | 7.5 | 9.7 | 0.36 | 0.00 | 0.28 | 0.34 | 1.27 | Infinite | 1.21 |
| Example 18 | 10.3 | — | 7.9 | 18.6 | 0.26 | 0.00 | 0.22 | 0.48 | 1.20 | Infinite | 2.21 |

Next, the catalyst's electrochemical performance was assessed by assembling into a membrane electrode assembly (MEA), and operating the catalyst as a fuel cell cathode, as described below. Typically, at least 2 separate MEAs for each catalyst type were fabricated and assessed, and average values are reported.

Comparative Example A catalyst and NSTF PtCoMn coated anode catalyst whiskers (0.05 mg$_{Pt}$/cm$^2$, Pt$_{69}$Co$_{28}$Mn$_3$) on MCTS were then transferred to either side of a 24-micrometer thick proton exchange membrane (obtained under the trade designation "3M PFSA 825EW" (neat) from 3M Company, St. Paul, MN), using a laminator (obtained under the trade designation "HL-101" from ChemInstruments, Inc., West Chester Township, OH) to form a catalyst coated membrane (CCM). The three-layer stack-up was hand fed into the laminator with hot nip rolls at 270° F. (132° C.), 150 psi (1.03 MPa) nip, and rotating at the equivalent of 0.5 fpm (0.25 cm/s). Immediately after lamination, the MCTS layers were peeled back, leaving the 800 and 1800 standard cubic centimeters per minute (sccm) of H$_2$ and air, respectively. During the 40-minute operational phase, the cell voltage was alternated between 5-minute long polarization cycles between 0.85 V and 0.25 V and 5-minute long potential holds at 0.40 V. During the 45-minute shutdown phase, the cell potential was set to open circuit voltage, H$_2$ and air flows to the cell were halted, and the cell temperature was cooled towards room temperature while liquid water was injected into the anode and cathode cell inlets at 0.26 g/min. and 0.40 g/min., respectively.

After conditioning the MEAs, the electrocatalysts were characterized for relevant beginning of life (BOL) characteristics, including catalyst activity, surface area, and operational performance under relevant H$_2$/Air test conditions, described as follows.

The cathode oxygen reduction reaction (ORR) absolute activity was measured with saturated 150 kPaA H$_2$/O$_2$, 80° C. cell temperature for 1200 seconds at 900 mV vs. the 100% H$_2$ reference/counter electrode. The ORR absolute activity (A/cm$^2$ or mA/cm$^2$) was obtained by adding the measured current density after 1050 seconds of hold time and the electronic shorting and hydrogen crossover current densities, estimated from 2 mV/s cyclic voltammograms measured with N$_2$ fed to the working electrode instead of O$_2$. The electrocatalyst mass activity, a measure of the catalyst activity per unit precious metal content, is calculated by dividing the corrected ORR absolute activity (A/cm$^2_{planar}$) by the cathode Pt areal loading (mg/cm$^2$) to obtain the Pt mass activity (A/mg$_{Pt}$), or by dividing the corrected ORR absolute activity by the cathode total platinum group metal (PGM) areal loading to obtain the PGM mass activity (A/mg$_{PGM}$). The PGM mass activity of Comparative Example A was 0.14 A/mg$_{PGM}$, reported in Table 5, below.

TABLE 5

| Example | Mass Activity A/mg$_{PGM}$ | Specific Area m$^2_{PGM}$/g$_{PGM}$ | Specific Activity mA/cm$^2_{PGM}$ |
|---|---|---|---|
| Comparative Example A | 0.14 | 10.4 | 1.35 |
| Comparative Example B | 0.16 | 13.2 | 1.23 |
| Comparative Example C | 0.16 | 11.4 | 1.37 |
| Comparative Example D | 0.15 | 9.5 | 1.61 |
| Comparative Example E | 0.16 | 8.0 | 2.01 |
| Example 1 | 0.01 | 0.3 | 3.05 |
| Example 2 | 0.09 | 3.2 | 2.46 |
| Example 3 | 0.20 | 12.2 | 1.63 |
| Example 4 | 0.19 | 12.6 | 1.50 |
| Example 5 | 0.27 | 14.8 | 1.84 |
| Example 6 | 0.21 | 13.0 | 1.62 |
| Example 7 | 0.16 | 11.4 | 1.45 |
| Example 8 | 0.00 | 0.2 | 0.00 |
| Example 9 | 0.03 | 0.7 | 4.79 |
| Example 10 | 0.21 | 15.1 | 1.41 |
| Example 11 | 0.20 | 15.4 | 1.31 |
| Example 12 | 0.25 | 11.4 | 2.23 |
| Example 13 | 0.36 | 20.7 | 1.76 |
| Example 14 | 0.29 | 19.3 | 1.51 |
| Example 15 | 0.25 | 15.7 | 1.61 |
| Example 16 | 0.22 | 19.1 | 1.14 |
| Example 17 | 0.23 | 17.9 | 1.29 |
| Example 18 | 0.16 | 15.4 | 1.05 |

The cathode catalyst surface enhancement factor (SEF, m$^2_{PGM}$/m$^2_{planar}$ or analogously cm$^2_{PGM}$/cm$^2_{planar}$) was measured via cyclic voltammetry (100 mV/s, 0.65 V-0.85 V, average of 100 scans) under saturated 101 kilopascals absolute pressure (kPaA) H$_2$/N$_2$ and 70° C. cell temperature. The SEF was estimated by taking the average of the integrated hydrogen underpotential deposition (H$_{UPD}$) charge (microC/cm$^2_{planar}$) for the oxidative and reductive waves and dividing by 220 microC/cm$^2_{Pt}$. The electrocatalyst's specific surface area (m$^2_{PGM}$/g$_{PGM}$), a measure of catalyst dispersion, was calculated by dividing the SEF (m$^2_{PGM}$/m$^2_{planar}$) by the areal PGM loading (g$_{PGM}$/m$^2_{planar}$). The specific area of Comparative Example A was 10.4 m$^2_{PGM}$/g$_{PGM}$, reported in Table 5, above.

The cathode catalyst oxygen reduction specific activity was calculated by dividing the corrected ORR absolute activity (A/cm$^2_{planar}$) by the SEF (cm$^2_{PGM}$/Cm$^2_{planar}$) to obtain the specific activity expressed in (A/cm$^2_{PGM}$), or after unit conversion as mA/cm$^2_{PGM}$ (multiply (A/cm$^2$) by 1000 mA per A). The specific activity of Comparative Example A was 1.35 mA/cm$^2_{PGM}$, summarized in Table 5, above.

Comparative Examples B-E

Comparative Example B-E were prepared and characterized as described for Comparative Example A, except that the Pt deposition process modified such that the Pt areal loadings were 23.8, 27.0, 54.2, and 98.1 micrograms/cm$^2$. The results are provided in Table 5, above.

Example 1

Example 1 catalyst was prepared and characterized as described for Comparative Example A, except that a layer of tantalum was deposited prior to the deposition of Pt, the Pt deposition conditions were modified to change the Pt loading, and the catalyst was thermally annealed prior to assembling into a membrane electrode assembly.

NSTF catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and 5-inch×15-inch (12.7 cm×38.1 cm) rectangular Pt and Ta sputter targets. The system base pressure was typically 2.5×10$^{-5}$ Torr (0.0033 Pa), and the typically determined background gas was water vapor. The coatings were deposited by using ultra high purity Ar as the sputtering gas.

A single Ta layer with planar equivalent thickness of about 0.5 nm was first deposited onto the whiskers on MCTS from a pure Ta target. The Ta deposition process was conducted 10 times, resulting in an areal Ta loading of about 8 micrograms/cm$^2$, a Ta planar equivalent thickness of 4.9 nm, and a Ta thickness on the microstructured whisker of about 0.0.35 nm. Next, a single Pt layer was deposited with a planar equivalent thickness of 0.46 nm. The Pt deposition process was conducted 5 times, resulting in an areal Pt loading of about 10 microgram/cm$^2$, a Pt planar equivalent thickness of 2.3 nm, and a Pt thickness on the microstructured whisker of about 0.17 nm, less than a monolayer of Pt.

After deposition, the electrocatalyst on MCTS was placed into a quartz tube furnace (obtained under the trade designation "LINDBERG BLUE M" from Thermo Electron Corporation, Waltham, MA) and heated to 340° C. under flowing H$_2$. After about a 20-minute temperature ramp, the catalyst was annealed for about 0.5 hour at temperature, and then allowed to cool to room temperature over about a 3-hour period. After cooling to room temperature, the tube furnace was purged with nitrogen for about 15 minutes to remove any remaining H$_2$, after which the catalyst on the substrate was removed from the furnace. After annealing, the catalyst was assembled into a membrane electrode assembly and characterized as described for Comparative Example A. The results are provided in Table 5, above.

Examples 2-7

Examples 2-7 were prepared and characterized as described for Example 1, except that the Pt deposition process modified such that the Pt areal loadings were about 10, 15, 20, 40, 50, and 78 micrograms/cm$^2$, respectively, and additional characterization was conducted, described below. The results are provided in Table 5, above.

Transmission electron microscopy (TEM) and Energy Dispersive X-Ray Spectroscopy (EDS) characterization was conducted on Example 2 catalyst after fuel cell characterization was completed. TEM and EDS characterizations were conducted on Example 4 catalyst after the catalyst metal was deposited onto the microstructured whiskers, after the catalyst was thermally annealed, and after fuel cell characterization. The Pt:Ta atomic ratios are summarized in Table 6, below. The Pt:Ta atomic ratio of Example 2 was 1.09. The Pt:Ta atomic ratio of Example 4 catalyst in the after deposition, after annealing, and after fuel cell testing states ranged between 2.17 and 2.27.

TABLE 6

| Example | State | Pt:Ta Atomic Ratio |
|---|---|---|
| Example 2 | After Fuel Cell | 1.09 |
| Example 4 | After Deposition | 2.17 |
| Example 4 | After Annealing | 2.22 |
| Example 4 | After Fuel Cell | 2.27 |

Examples 2 and 4-7 were characterized by X-Ray Diffraction (XRD) to determine apparent crystallite sizes and face-centered cubic (FCC) lattice parameters of the catalysts, summarized in Table 7, below.

TABLE 7

| | Apparent Crystallite Size, nm | | FCC Lattice Parameter, nm | |
|---|---|---|---|---|
| Example | After Deposition | After Annealing | After Deposition | After Annealing |
| Example 2 | — | — | — | — |
| Example 4 | — | 5.0 | — | 0.395 |
| Example 5 | 5.9 | 6.0 | 0.395 | 0.393 |
| Example 6 | 6.3 | 9.1 | 0.394 | 0.392 |
| Example 7 | 7.7 | 9.3 | 0.393 | 0.392 |
| Example 8 | — | — | — | — |

XRD characterization was conducted on the catalyst in the after deposition and after annealing states. After deposition, the apparent crystallite sizes for Examples 5-7 ranged from 5.9 to 7.7 nm and the FCC lattice parameters ranged from 0.395 to 0.393 nm. After annealing, the apparent crystallite sizes of Examples 4-7 ranged from 5.0 to 9.3 nm and the FCC lattice parameters ranged from 0.395 to 0.392 nm. Crystalline phases were not detected in Example 2 catalyst.

Examples 2 and 4-7 were further characterized by X-Ray Photoelectron Spectroscopy (XPS) to determine relative elemental concentrations near the catalyst surface. Table 8, below, summarizes the relative atomic % of C, O, Pt, and Ta.

TABLE 8

| | After deposition | | | | After annealing | | | |
|---|---|---|---|---|---|---|---|---|
| Example | C, at. % | O, at. % | Pt, at. % | Ta, at. % | C, at. % | O, at. % | Pt, at. % | Ta, at. % |
| Example 2 | 52.1 ± 2.7 | 4.8 ± 0.1 | 32.9 ± 2.0 | 10.2 ± 0.7 | 83.8 ± 0.5 | 2.5 ± 0.0 | 11.3 ± 0.3 | 2.4 ± 0.2 |
| Example 4 | 41.6 ± 0.7 | 3.2 ± 0.3 | 51.6 ± 1.1 | 3.5 ± 0.4 | 79.5 ± 0.6 | 1.7 ± 0.0 | 17.3 ± 0.6 | 1.5 ± 0.5 |
| Example 5 | 35.2 ± 1.8 | 2.0 ± 0.1 | 61.7 ± 1.7 | 1.1 ± 0.4 | 77.3 ± 0.6 | 1.4 ± 0.1 | 20.5 ± 0.6 | 0.7 ± 0.3 |
| Example 6 | 31.4 ± 1.4 | 1.5 ± 0.1 | 66.8 ± 1.3 | 0.4 ± 0.1 | 72.6 ± 0.5 | 1.1 ± 0.1 | 26.1 ± 0.7 | 0.2 ± 0.2 |
| Example 7 | 30.9 ± 1.6 | 1.2 ± 0.2 | 67.8 ± 1.7 | 0.0 ± 0.0 | 63.5 ± 2.0 | 1.3 ± 0.1 | 35.2 ± 2.0 | 0.1 ± 0.1 |
| Example 8 | 42.2 ± 1.5 | 7.4 ± 0.2 | 30.9 ± 1.2 | 19.5 ± 0.8 | 83.1 ± 0.8 | 3.1 ± 0.1 | 8.9 ± 0.6 | 4.9 ± 0.1 |

After deposition, the relative C concentrations ranged from 30.9 to 52.1 at. %, the relative O concentrations ranged from 1.2 to 7.4 at. %, the relative Pt concentrations ranged from 30.9 to 67.8 at. %, and the relative Ta concentrations ranged from 0.0 to 19.5 at. %. After annealing, the relative C concentrations ranged from 63.5 to 83.8 at. %, the relative O concentrations ranged from 1.1 to 3.1 at. %, the relative Pt concentrations ranged from 8.9 to 35.2 at. %, and the relative Ta concentrations ranged from 0.1 to 4.9 at. %.

Examples 8-11

Examples 8-11 were prepared and characterized as described for Example 1, except that the Ta and Pt deposition processes were modified such that the Ta and Pt areal loadings were different than Example 1, and additional characterization was conducted on Example 8, described below. The Ta areal loading for Examples 8-11 was about 33 micrograms per $cm^2$. The Pt areal loadings for Examples 8, 9, 10, and 11 were about 10, 20, 35, and 50 micrograms/$cm^2$, respectively. The results for Examples 8-11 are provided in Table 5, above. Additionally, Example 8 catalyst was characterized by XRD and XPS as described above for Example 2, and results for Example 8 catalyst are provided in Tables 5, 7, and 8, above.

Example 12

Example 12 was prepared and characterized as described for Example 1, except that the Pt deposition conditions were modified resulting in a different Pt areal loading and Ni was also deposited.

NSTF catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and 5-inch×15-inch (12.7 cm×38.1 cm) rectangular Pt, Ta, and Ni sputter targets. The system base pressure was typically $2.5 \times 10^{-5}$ Torr (0.0033 Pa), and the typically determined background gas was water vapor. The coatings were deposited by using ultra high purity Ar as the sputtering gas.

A single Ta layer with a targeted areal loading of 0.8 microgram per $cm^2$ was first deposited onto the whiskers on MCTS from a pure Ta target. The Ta deposition process was conducted 10 times, resulting in an areal loading of about 8 micrograms/$cm^2$. Next, a single Pt layer was deposited with targeted areal loading of 1.0 microgram per $cm^2$. Next, a single Ni layer was deposited with a targeted areal loading of 0.5 microgram per $cm^2$. The alternating Pt and Ni deposition processes were conducted 10 times, resulting in an areal loading of about 10 micrograms of Pt per $cm^2$ and 5 micrograms of Ni per $cm^2$ and a Pt:Ni atomic ratio of about 0.60. After deposition, Example 8 catalyst was annealed and characterized as described for Example 1, above. The results are provided in Table 5, above.

Examples 13-15

Examples 13-15 were prepared and characterized as described for Example 8, except that the Pt and Ni deposition conditions were modified, resulting in different Pt and Ni loadings. The Pt loadings of Examples 13, 14, and 15 were 20, 30, and 50 micrograms/$cm^2$, respectively, and the Ni loadings were 10, 15, and 25 micrograms per $cm^2$, respectively. After deposition, Examples 13-15 catalysts were annealed and characterized as described for Example 1. The results are provided in Table 5, above.

Example 16

Example 16 was prepared and characterized as described for Example 1, except that prior to Pt deposition, a layer of Ir was deposited onto the Ta layer.

NSTF catalyst layers were prepared by sputter coating catalyst films sequentially using a DC-magnetron sputtering process onto the layer of microstructured whiskers, Preparatory Example A. A vacuum sputter deposition system was used with typical Ar sputter gas pressures of about 3.3 mTorr (0.44 Pa), and 5-inch×15-inch (12.7 cm×38.1 cm) rectangular Pt, Ta, and Ir sputter targets. The system base pressure was typically $2.5\times10^{-5}$ Torr (0.0033 Pa), and the typically determined background gas was water vapor. The coatings were deposited by using ultra high purity Ar as the sputtering gas.

A single Ta layer with a targeted areal loading of 0.8 microgram per $cm^2$ was first deposited onto the whiskers on MCTS from a pure Ta target. The Ta deposition process was conducted 10 times, resulting in an areal loading of about 8 micrograms/$cm^2$. Next, a single Ir layer with a targeted areal loading of 1.0 microgram per $cm^2$ was deposited from a pure Ir target. The Ir deposition process was repeated 5 times, resulting in an areal loading of about 5 micrograms/$cm^2$. Next, a single Pt layer was deposited with targeted areal loading of 1.0 microgram per $cm^2$. The Pt deposition process was conducted 10 times, resulting in an areal loading of about 10 micrograms/$cm^2$. After deposition, Example 16 catalyst was annealed and characterized as described for Example 1, above. The results are provided in Table 5, above.

Examples 17-18

Examples 17-18 were prepared and characterized as described for Example 16, except that the Ir deposition conditions were modified, resulting in different Ir loadings. The Ir loadings of Examples 17 and 18 were 10 and 15 micrograms/$cm^2$, respectively. The results are provided in Table 5, above.

Figure 3:
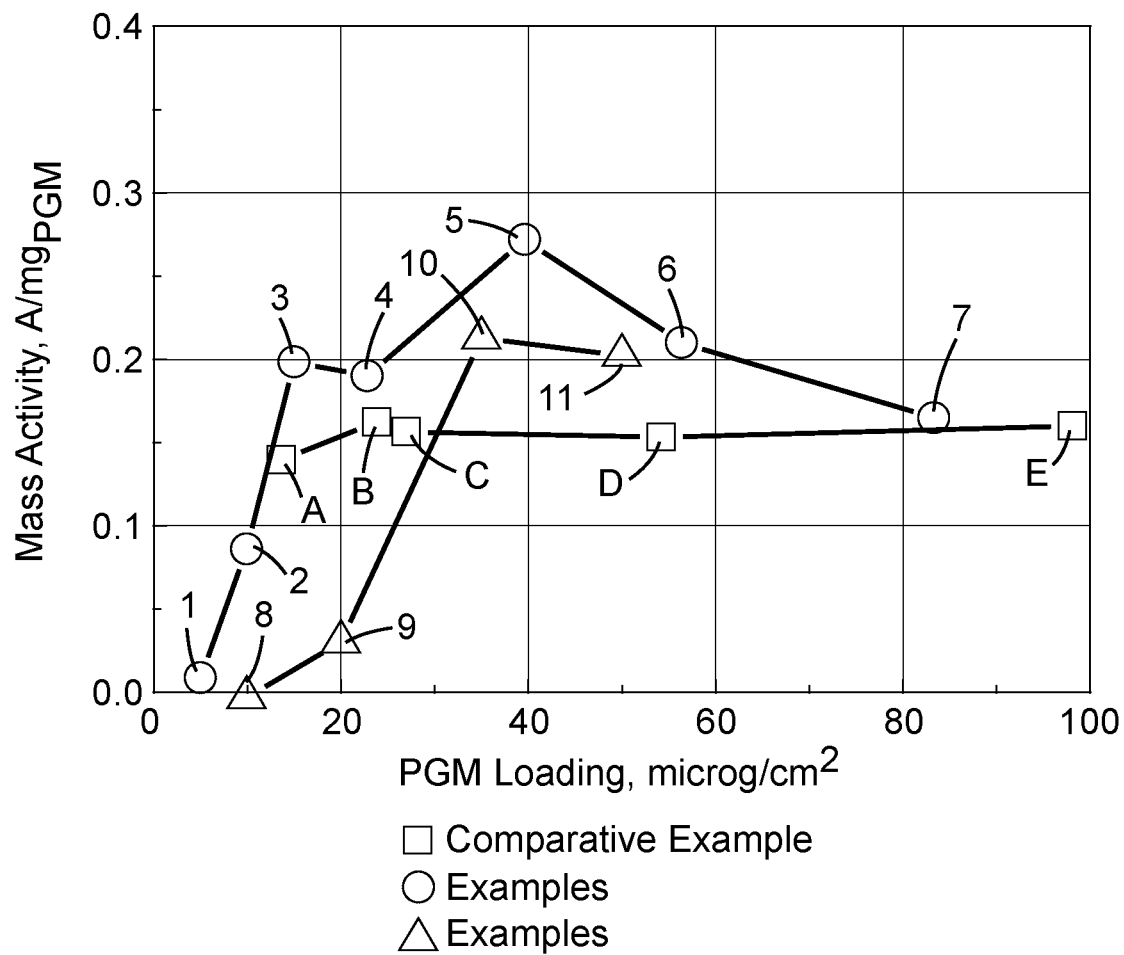
FIG. 3 is a plot of the electrocatalyst mass activity as a function of catalyst loading of Examples 1-11 and Comparative Examples A-E catalysts, normalized to platinum group metal content.

FIG. 3 is a plot of mass activities as a function of areal PGM loading of Examples 1-7 (various Pt loadings on Ta underlayers with fixed loadings of 8 micrograms/$cm^2$), Examples 8-11 (various Pt loadings on Ta underlayer with fixed loadings of 33 micrograms/$cm^2$), and Comparative Examples A-E (various Pt loadings with no underlayer). The mass activities of Comparative Examples A-E ranged from 0.14 to 0.16 A/mg. The mass activities of Examples 1-12 ranged from 0.01 to 0.27 A/mg, and depended on both Pt and Ta areal loadings. The mass activities of Examples 3-6 and 10-11 exceeded the mass activities of the Comparable Examples over similar areal PGM loading ranges. Without being bound by theory, the mass activity depends upon Pt:Ta atomic ratio and the Pt thickness, and higher mass activities may occur with catalysts within a range of optimal Pt:Ta atomic ratios and Pt thicknesses.

Figure 4:
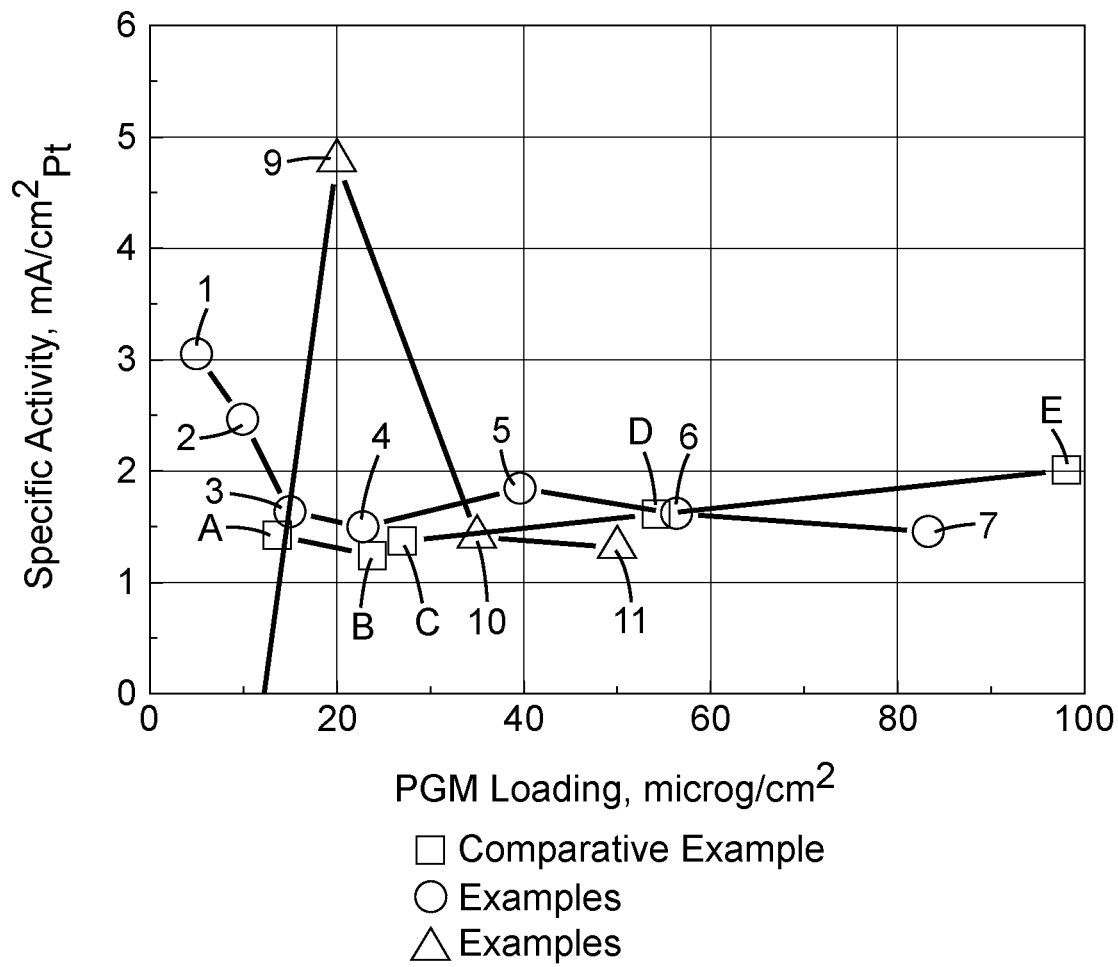
FIG. 4 is a plot of the electrocatalyst specific activity as a function of catalyst loading of Examples 1-11 and Comparative Examples A-E catalysts.

FIG. 4 is a plot of specific activities as a function of areal PGM of Examples 1-7, Examples 8-11, and Comparative Examples A-E. The specific activities of Comparative Examples A-E ranged from 1.35 to 2.01 mA/$cm^2$. The specific activities of Examples 1-7 ranged between 1.45 to 3.05 mA/$cm^2$, and the specific activities of Examples 8-11 ranged from 0.00 to 4.79 mA/$cm^2$. The specific activities of Examples 1-5 and 9 were higher than the specific activities of the Comparative Examples over similar areal PGM loading ranges. The specific activities of Pt catalyst may depend upon the Pt—Pt bond spacing, and without being bound by theory, the presence of the Ta underlayer may influence the Pt—Pt bond spacing at the Pt surface.

Figure 5:
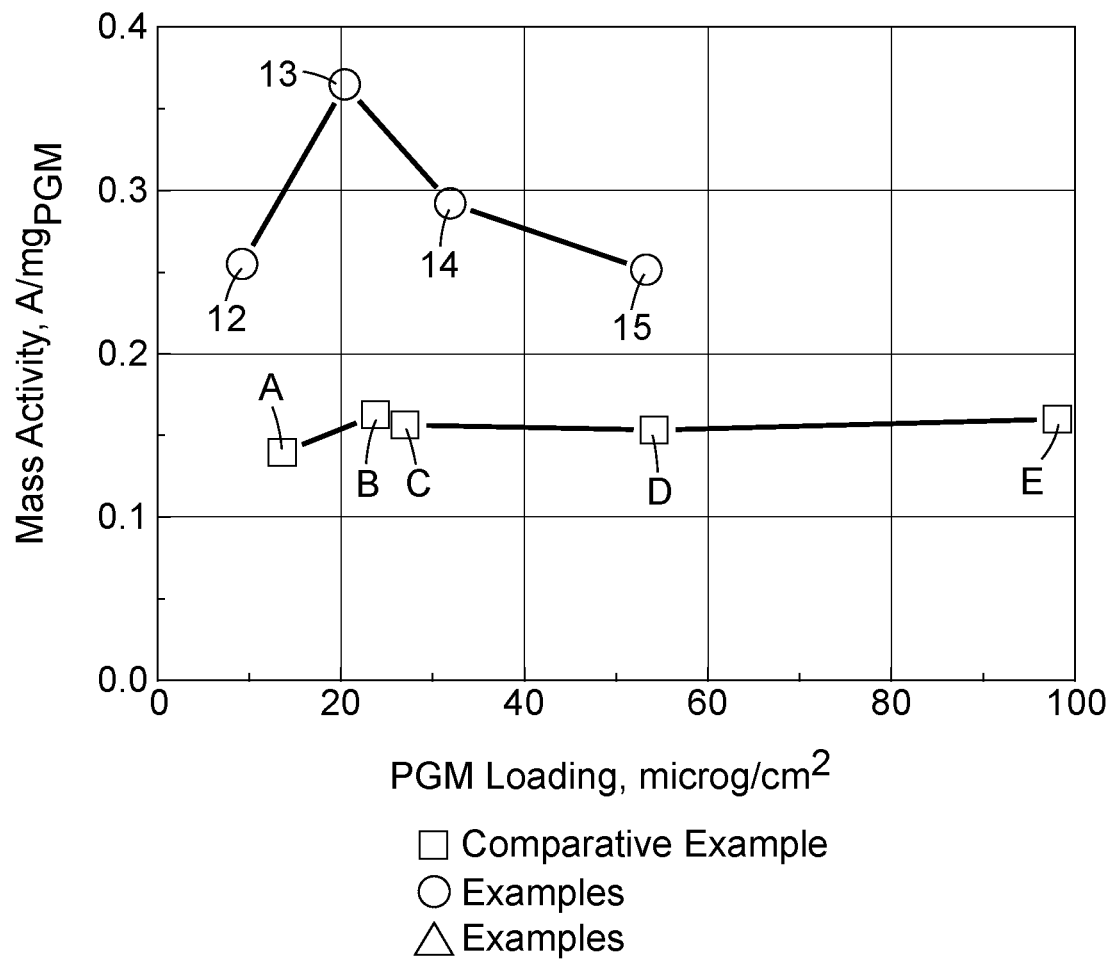
FIG. 5 is a plot of the electrocatalyst mass activity as a function of catalyst loading of Examples 12-15 and Comparative Examples A-E catalysts, normalized to platinum group metal content.

FIG. 5 is a plot of mass activities as a function of areal PGM loading of Examples 12-15 and Comparative Examples A-E. Examples 12-15 comprised a PtNi surface layer on the Ta underlayer. The mass activities of Comparative Examples A-E ranged from 0.14 to 0.16 A/mg, and the mass activities of Examples 12-15 ranged from 0.25 to 0.36 A/mg, higher than the Comparative Examples which did not contain a Ta underlayer.

Figure 6:
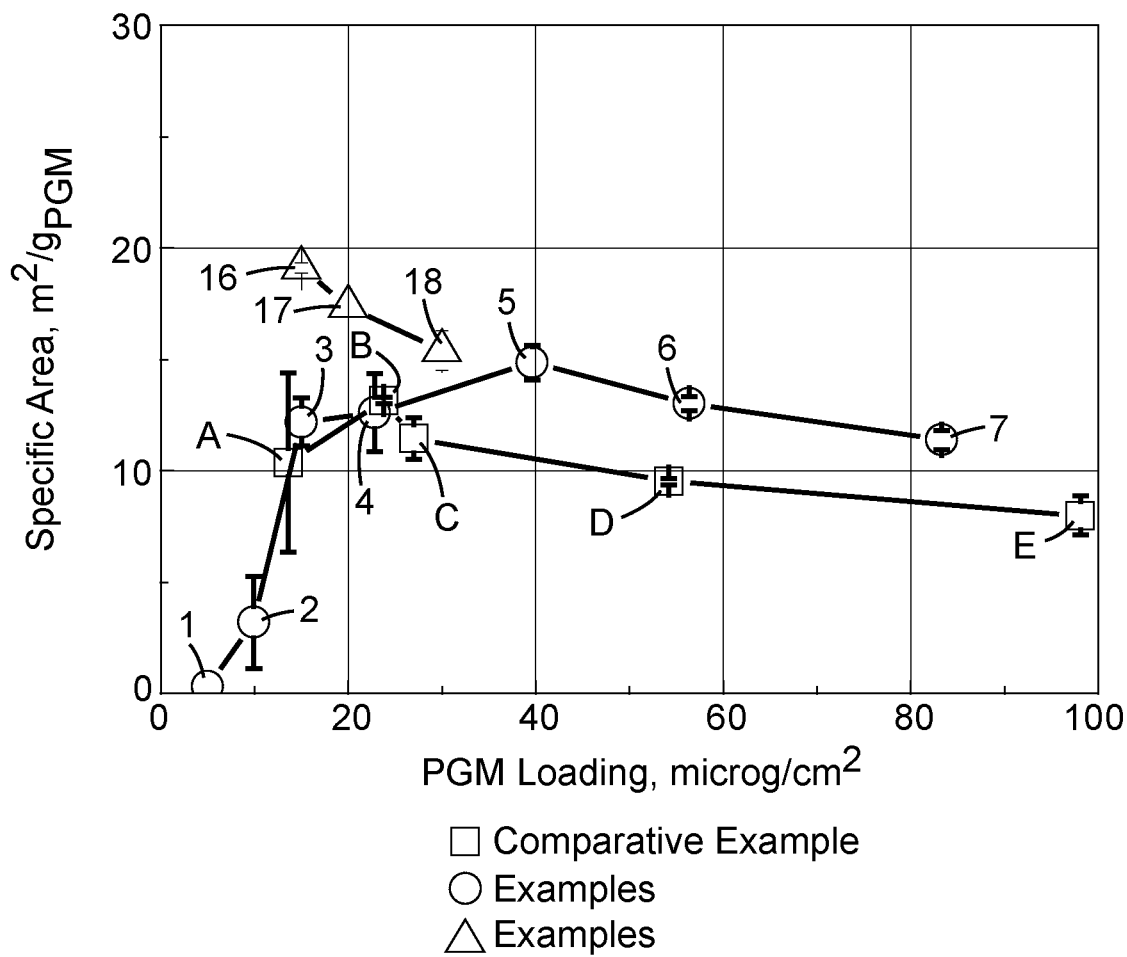
FIG. 6 is a plot of the electrocatalyst specific surface area as a function of catalyst loading of Examples 1-7, Examples 16-18 and Comparative Examples A-E catalysts, normalized to platinum group metal content.

FIG. 6 is a plot of specific surface areas as a function of areal PGM loading of Examples 1-7, Examples 16-18, and Comparative Examples A-E. Examples 16-18 comprised an Ir layer between the Pt surface layer and the Ta underlayer. The specific areas of Comparative Examples A-E ranged from 8.0 to 13.2 $m^2$/g. The specific areas of Examples 1-7 ranged from 0.3 to 14.8 $m^2$/g and the specific areas of Examples 16-18 ranged from 15.4 to 19.1 $m^2$/g. The specific areas of Examples 1-7 and 16-18 depended on Pt, Ta, and Ir areal loadings. The specific areas of Examples 16-18, which contained an Ir layer between the Pt and Ta layers, were higher than Examples 1-7, which did not contain the Ir layer between the Pt and Ta layers, at the same PGM areal loading. Without being bound by theory, the specific area may depend upon the Pt:Ta atomic ratio, the Pt thickness, and the Ir thickness, and the presence of an Ir layer between the Pt and Ta layers may yield thinner Pt thicknesses for a given Pt areal loading, due to increased Pt adhesion to the Ir layer than Pt adhesion to the Ta layer.

Table 9, below, summarizes the percentage increase in specific area of Examples 1-11 and Examples 16-18, relative to Comparative Examples A-E, at the same catalyst thickness on whisker support.

TABLE 9

| Example | Measured Specific Area, $m^2$/g | Estimated Thickness on Support, nm | Interpolated Specific Area of Pt, $m^2$/g | Specific Area Increase vs. Pt Only, % |
| --- | --- | --- | --- | --- |
| Comparative Example A | 10.4 | 0.33 | 10.4 | 0 |
| Comparative Example B | 13.2 | 0.67 | 13.2 | 0 |
| Comparative Example C | 11.4 | 0.83 | 11.4 | 0 |
| Comparative Example D | 9.5 | 1.67 | 9.5 | 0 |
| Comparative Example E | 8.0 | 3.33 | 8.0 | 0 |
| Example 1 | 0.3 | 0.51 | 11.9 | −97 |
| Example 2 | 3.2 | 0.68 | 13.0 | −75 |
| Example 3 | 12.2 | 0.85 | 11.4 | 7 |
| Example 4 | 12.6 | 1.01 | 11.0 | 14 |
| Example 5 | 14.8 | 1.68 | 9.5 | 56 |

TABLE 9-continued

| Example | Measured Specific Area, m²/g | Estimated Thickness on Support, nm | Interpolated Specific Area of Pt, m²/g | Specific Area Increase vs. Pt Only, % |
|---|---|---|---|---|
| Example 6 | 13.0 | 2.01 | 9.2 | 42 |
| Example 7 | 11.4 | 2.95 | 8.3 | 37 |
| Example 8 | 0.2 | 1.77 | 9.4 | −98 |
| Example 9 | 0.7 | 2.10 | 9.1 | −93 |
| Example 10 | 15.1 | 2.60 | 8.7 | 75 |
| Example 11 | 15.4 | 3.10 | 8.2 | 88 |
| Example 16 | 19.1 | 0.84 | 11.4 | 67 |
| Example 17 | 17.9 | 1.00 | 11.1 | 62 |
| Example 18 | 15.4 | 1.31 | 10.3 | 49 |

Comparative Example data was not available at the precise thicknesses on support as the Examples. Using the Comparative Examples A-E data, linear interpolation was used to estimate the specific surface areas at the specific thicknesses of the Examples 1-11 and Examples 16-18. For example, the Pt+Ta thickness on support for Example 5 was 1.68 nm and the measured specific area was 14.8 m²/g. The Pt thicknesses for Comparative Examples D and E (which do not contain Ta) were 1.67 and 3.33, respectively, and the associated specific areas were 9.5 and 8.0 m²/g, respectively. Using linear interpolation, the estimated specific area of a Comparative Example at 1.68 nm thickness was estimated as 9.5 m²/g. The specific area of Example 5 was 56% higher than that estimated for Pt only at the same thickness on support ((14.8−9.5)/9.5*100%). Analogous analyses were conducted for the Comparative Example A-E and Examples 1-11 and Examples 16-18 data. The specific areas of the Examples 1-11 data ranged from 97% lower to 88% higher than Comparative Examples A-E on a thickness basis. The specific areas of Examples 16-18 ranged from 49 to 67% higher than the Comparative Examples A-E. The specific area enhancement of the Examples depends upon Pt thickness, Ta, thickness, the Pt:Ta atomic ratio, and the presence of an Ir layer between the Pt and Ta layers.

Figure 7:
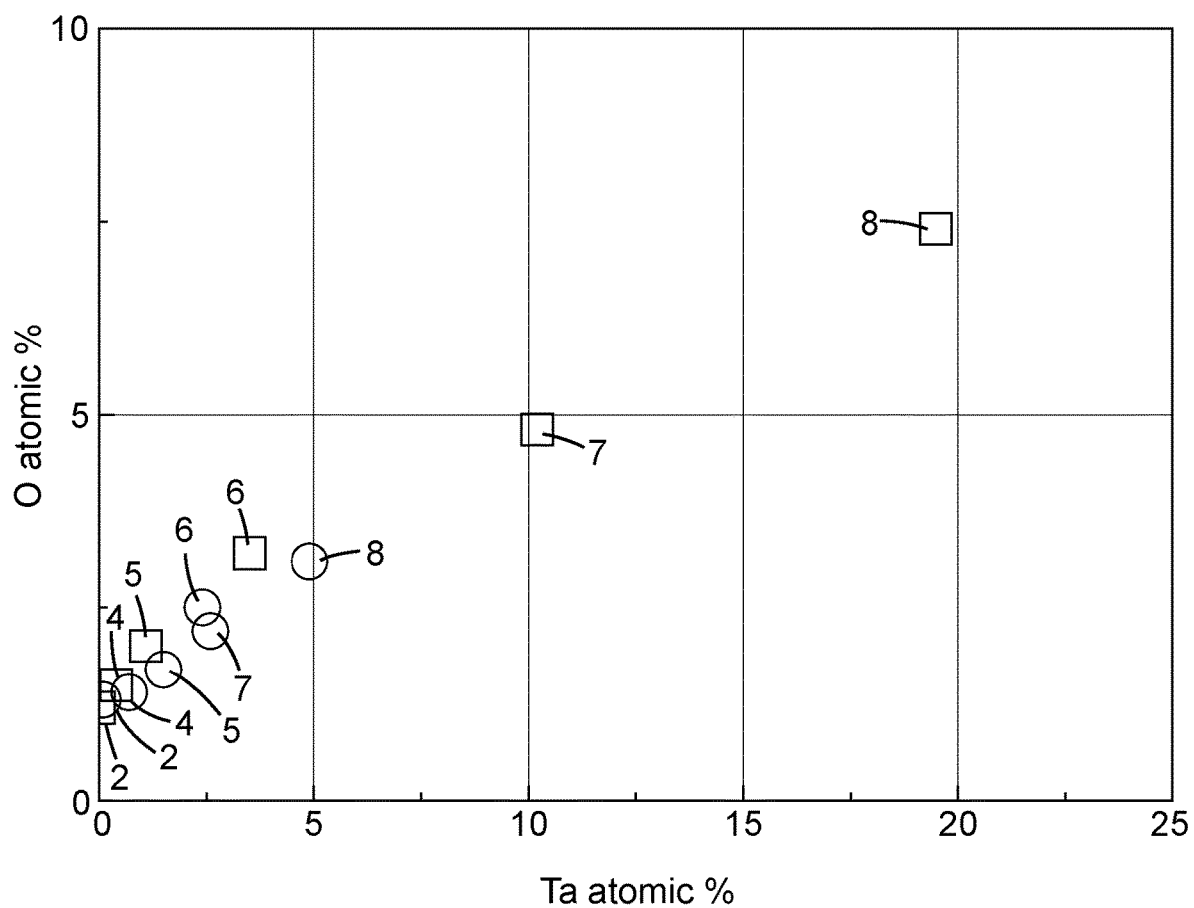
FIG. 7 is a plot of the electrocatalyst relative oxygen content as a function of electrocatalyst tantalum content of Example 2 and Examples 4-8.

FIG. 7 is a plot of the relative O content as a function of relative Ta content, determined from the XPS analysis of Examples 2 and 4-8 catalysts in both the as-deposited and annealed states, and listed in Table 8, above. The relative Ta and O contents were correlated with each other, indicating that the oxygen present is predominantly associated with the tantalum and that the tantalum is at least partially oxidized.

Figure 8:
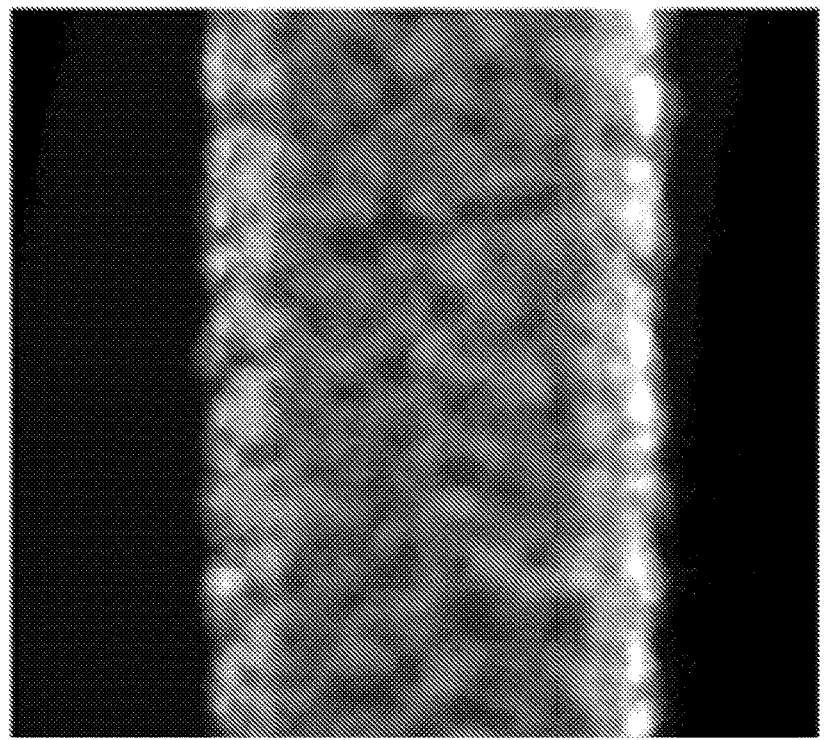
FIG. 8 is a High Angle Annular Dark Field Transmission Electron Micrograph of Example 2 catalyst at 1,000,000× magnification, after deposition of the catalyst onto the optional support whisker.
Figure 9:
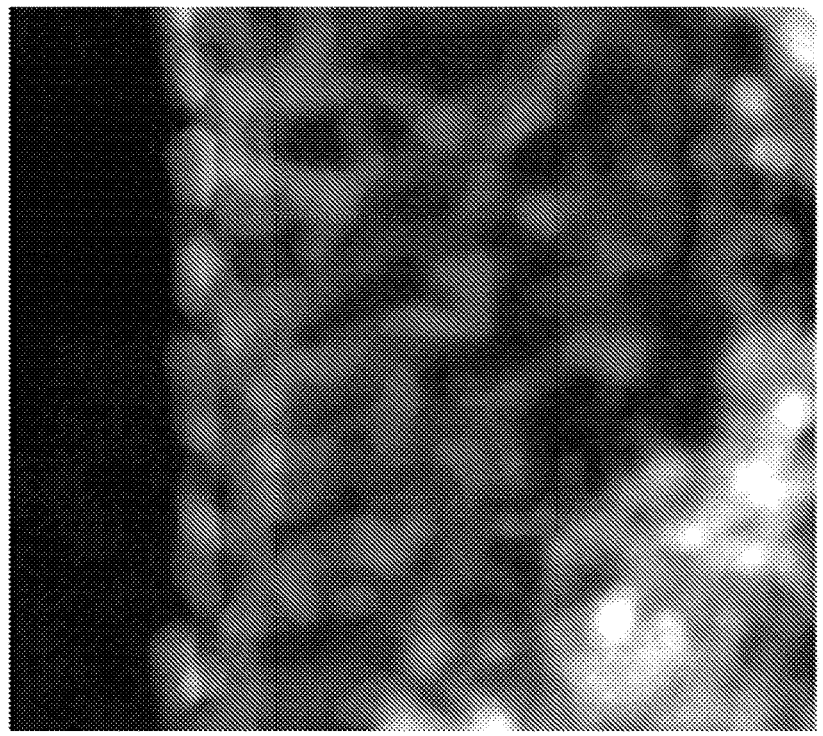
FIG. 9 is a High Angle Annular Dark Field Transmission Electron Micrograph of Example 2 catalyst at 1,000,000× magnification, after annealing the catalyst.

FIGS. 8 and 9 are TEM micrographs of Example 2 catalyst on a microstructured whisker, after catalyst deposition and after fuel cell characterization, respectively. After deposition, the Pt consists of a nm-scale grain coating on the Ta layer. After fuel cell characterization, the Pt consists of discontinuous islands on the Ta underlayer, and the Pt is more agglomerated as compared to after deposition, indicating that the Pt has dewetted from the Ta underlayer. FIGS. 10 and 11 are TEM micrographs of Example 4 catalyst on a microstructured whisker, after catalyst deposition and after fuel cell characterization, respectively. After fuel cell characterization, the Pt consists of a largely-continuous coating on the Ta underlayer, and the Pt coating is much less agglomerated than Example 2 after fuel cell characterization.

As shown in FIG. 7 and discussed above, the Ta may be oxidized. Oxidized Ta has lower electronic conductivity than metallic Ta. Without being bound by theory, it is believed that Pt islands that are not in contact with other Pt islands and which are on a Ta layer with insufficient electronic conductivity may not be utilized in the electrochemical reaction, and the overall mass activity of the catalyst will be reduced. The less agglomerated structure of the Pt coating of Example 4 than Example 2 may be responsible for the higher mass activity of Example 4 than Example 2.

FIG. 12 is a TEM micrograph of Example 4 catalyst on a microstructured whisker, after fuel cell testing. FIG. 13 is an EDS map of illustrating the Pt and Ta distribution over the same area as shown in FIG. 12. FIG. 14 is an EDS map over the same region, illustrating only the Ta, and FIG. 15 is an EDS map illustrating only the Pt. The surface of the catalyst is Pt-rich and is on top of a Ta-rich layer, which is itself on the whisker support. The layered structure produced during deposition was maintained after fuel cell testing. EDS was also used to determine the Pt:Ta atomic ratios for the Examples 2 and 4 catalysts. Example 2 catalyst was evaluated after fuel cell testing, whereas Example 4 catalyst was assessed in the as-deposited, annealed, and fuel cell tested states. Table 6, above, shows the Pt:Ta atomic ratios determined via EDS for Examples 2 and 4, 1.09 and 2.27, respectively, were similar to the targeted Pt:Ta atomic ratios of 1.16 and 2.32, respectively, listed in Table 2, above. The Example 4 Pt:Ta ratios in the as-deposited and annealed states were similar to the Pt:Ta atomic ratio after fuel cell testing, indicating electrochemical stability of Ta.

Figure 16:
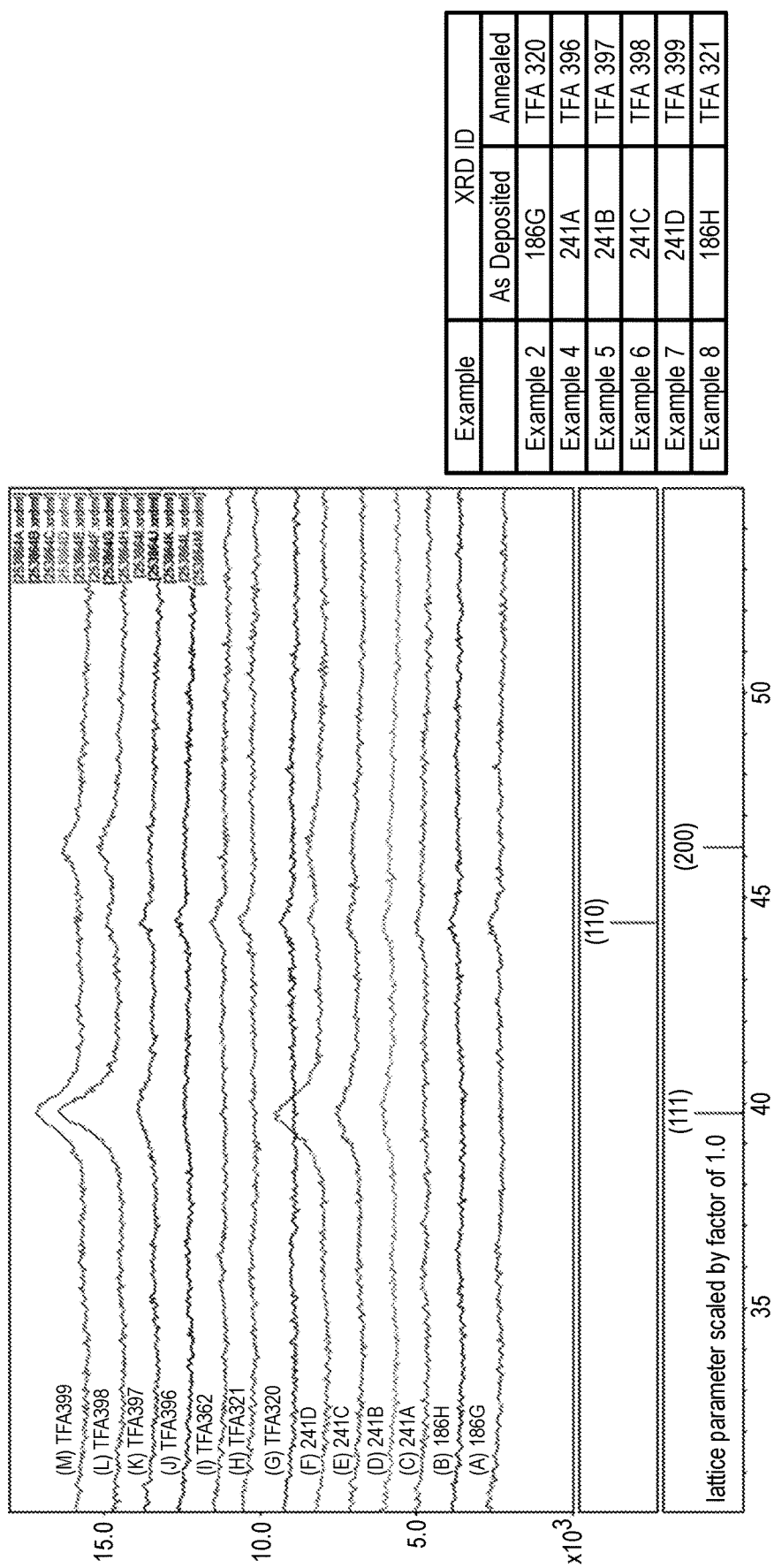
FIG. 16 is a plot of X-Ray Diffraction spectra of Example 2 and Examples 4-8 catalysts, both after deposition of the catalyst onto the optional support whisker and after annealing the catalyst.

FIG. 16 is a plot summarizing XRD spectra of Examples 2 and 4-8, taken both after catalyst deposition onto the support and after thermal annealing. XRD was used to assess the bulk crystalline structure of the catalysts, tabulated in Table 7, above. No crystalline Pt features were detected with Example 2, 10 micrograms of Pt per cm² on tantalum, in either the as deposited or annealed states, indicating the Pt present was either amorphous or the crystallite sizes were too small to be detected. As the Pt loading increased to 20 micrograms/cm² (Example 4), Pt features were detected after annealing, with a 5.0 nm grain size and 0.395 nm lattice constant, larger than bulk Pt, 0.392 nm. As the Pt content increased to 40 micrograms per cm² (Example 5), the grain sizes increased to 5.9 and 6.0 nm in the as-deposited and annealed states, with lattice constants of 0.395 and 0.393 nm, respectively, still larger than the bulk Pt lattice constant. As the loadings increased further to 50 and 78 micrograms per cm², the crystallite sizes increased further, consistent with increased Pt thickness on the tantalum layer, and the lattice parameters decreased towards the pure Pt value.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising:
   nanostructured elements comprising microstructured whiskers having an outer surface; and
   a catalyst on the outer surface, the catalyst comprising a Ta layer having an outer layer with a layer comprising Pt directly thereon, wherein the Ta layer has an average thickness in a range from 0.04 to 30 nanometers, wherein the layer comprising Pt has an average thickness in a range from 0.04 to 50 nanometers, and wherein the Pt and Ta are present in an atomic ratio in a range from 0.01:1 to 10:1.

2. The article of claim 1, wherein the catalyst surface area is at least 20% greater than would be present without the presence of the Ta layer.

3. The article of claim 1, wherein the catalyst further comprises at least one pair of alternating layers, wherein the first alternating layer comprises Ta, and wherein the second alternating layer comprises Pt.

4. A catalyst comprising:
   a Ta layer having an outer layer with a layer comprising Pt thereon, wherein the Ta layer has an average thickness in a range from 0.04 to 30 nanometers, wherein the layer comprising Pt has an average thickness in a range from 0.04 to 50 nanometers, and wherein the Pt and Ta are present in an atomic ratio in a range from 0.01:1 to 10:1, and a layer comprising Ir is present between the Ta layer and the layer comprising Pt, and wherein the layer comprising Ir has an average thickness in a range from 0.04 to 50 nanometers.

5. The catalyst of claim 4, wherein the Ta to Ir atomic ratio is in a range from 0.01:1 to 100:1.

6. The article of claim 1, wherein the layer comprising Pt comprises Pt crystallites with an FCC lattice constant in a range from 0.395 to 0.392 nm.

7. The article of claim 1, wherein the layer comprising Pt comprises Pt crystallites with a crystallite size in a range from 2 to 20 nanometers.

8. The article of claim 1, wherein the layer comprising Pt further comprises Ni.

9. The article of claim 8, wherein the Pt to Ni atomic ratio is in a range from 0.5:1 to 5:1.

10. A method of making the catalyst of claim 4, the method comprising depositing the Ta layer, the layer of Ir, the layer comprising Pt, or combinations thereof via a deposition technique independently selected from the group consisting of sputtering, atomic layer deposition, metal organic chemical vapor deposition, molecular beam epitaxy, ion soft landing, thermal physical vapor deposition, vacuum deposition by electrospray ionization, and pulse laser deposition.

11. The article of claim 1, wherein the Ta layer is directly on the microstructured whiskers.

12. The article of claim 1, wherein the microstructured whiskers are attached to a backing.

13. A method of making the article of claim 1, the method comprising depositing the Ta layer, the layer comprising Pt, or both via a deposition technique independently selected from the group consisting of sputtering, atomic layer deposition, metal organic chemical vapor deposition, molecular beam epitaxy, ion soft landing, thermal physical vapor deposition, vacuum deposition by electrospray ionization, and pulse laser deposition.

14. The method of claim 13, further comprising annealing at least one of the Ta layer or the layer comprising Pt.

15. The catalyst of claim 4, wherein the layer comprising Pt comprises Pt crystallites with an FCC lattice constant in a range from 0.395 to 0.392 nm.

16. The catalyst of claim 4, wherein the layer comprising Pt comprises Pt crystallites with a crystallite size in a range from 2 to 20 nanometers.

17. The catalyst of claim 4, wherein the layer comprising Pt further comprises Ni.

18. The catalyst of claim 17, wherein the Pt to Ni atomic ratio is in a range from 0.5:1 to 5:1.

* * * * *